(12) United States Patent
Brady

(10) Patent No.: US 8,011,111 B2
(45) Date of Patent: Sep. 6, 2011

(54) MEASURING DEVICE AND ACCESSORIES FOR PREPARING QUILT PIECES

(76) Inventor: John R. Brady, Lake Forest, CA (US)

( * ) Notice: Subject to any disclaimer, the term of this patent is extended or adjusted under 35 U.S.C. 154(b) by 446 days.

(21) Appl. No.: 12/173,789

(22) Filed: Jul. 15, 2008

(65) Prior Publication Data

US 2009/0025245 A1    Jan. 29, 2009

Related U.S. Application Data

(60) Provisional application No. 60/951,529, filed on Jul. 24, 2007.

(51) Int. Cl.
*G01B 3/14* (2006.01)
(52) U.S. Cl. ............................... 33/562; 33/494
(58) Field of Classification Search .................. 33/562, 33/563, 2 R, 11–13, 17 R, 470, 494
See application file for complete search history.

(56) References Cited

U.S. PATENT DOCUMENTS

| | | | | |
|---|---|---|---|---|
| 611,697 A | * | 10/1898 | Lundy | 33/437 |
| 1,338,951 A | * | 5/1920 | Nadel | 33/277 |
| 1,523,919 A | * | 1/1925 | Merriam et al. | 33/474 |
| 1,821,369 A | * | 9/1931 | Wetterstrand | 33/564 |
| 2,230,010 A | * | 1/1941 | Owens | 33/489 |
| 2,352,169 A | * | 6/1944 | Alexander | 33/484 |
| 2,633,644 A | * | 4/1953 | May | 33/574 |
| 2,722,055 A | * | 11/1955 | Rader | 33/483 |
| 2,855,675 A | * | 10/1958 | Kolthoff | 33/2 R |
| 3,345,748 A | * | 10/1967 | Snyder | 33/2 R |
| 3,465,445 A | * | 9/1969 | Fisher | 33/27.03 |
| 3,598,493 A | * | 8/1971 | Fisher | 250/231.16 |
| 3,611,574 A | * | 10/1971 | Young et al. | 33/431 |
| 3,664,028 A | * | 5/1972 | Smith | 33/430 |
| 3,738,010 A | * | 6/1973 | Carder | 33/489 |
| 4,345,383 A | * | 8/1982 | Corsette | 33/474 |
| 4,349,966 A | * | 9/1982 | Marino et al. | 33/489 |
| 4,577,415 A | * | 3/1986 | Schiller | 33/430 |
| 4,589,210 A | * | 5/1986 | Konrad | 33/27.03 |
| 4,594,792 A | * | 6/1986 | Cramb | 33/562 |
| 4,734,993 A | * | 4/1988 | Pan | 33/483 |
| 4,821,424 A | * | 4/1989 | Loggins | 33/474 |
| 4,831,739 A | * | 5/1989 | Davidson | 33/427 |
| 4,843,720 A | * | 7/1989 | Kim | 33/812 |
| 4,875,667 A | * | 10/1989 | Schafer | 269/91 |
| 4,936,020 A | * | 6/1990 | Neblett | 33/566 |
| 5,191,716 A | * | 3/1993 | Anderson | 33/483 |
| 5,253,790 A | * | 10/1993 | Brady | 223/109 R |
| D374,404 S | * | 10/1996 | Kidd | D10/71 |
| 5,577,328 A | * | 11/1996 | Kerry, Sr. | 33/563 |
| 5,579,670 A | * | 12/1996 | McCormick | 83/56 |
| 5,615,488 A | * | 4/1997 | Brady | 33/484 |
| 5,653,035 A | * | 8/1997 | Chen | 33/484 |

(Continued)

*Primary Examiner* — G. Bradley Bennett
*Assistant Examiner* — Tania C Courson

(57) ABSTRACT

A transparent measuring apparatus for material includes a planar structure including a top surface, bottom surface, a left edge, a right edge, a top end, a bottom end and a plurality of holes for attachment of accessories. A plurality of measurement lines is formed on at least one of the top and bottom surfaces. A material alignment guide is attached to the bottom surface. The material alignment guide includes a first edge for aligning the material and is configured for moveably aligning the first edge with the measurement lines. Protrusions extend below the bottom surface a sufficient distance from the bottom surface to facilitate movement of the material alignment device. A plurality of accessories adds width to the planer structure, adds length to the planer structure, provides a safety barrier when cutting along an edge and provides a slot for guiding cutting along an edge of the planer structure.

57 Claims, 16 Drawing Sheets

U.S. PATENT DOCUMENTS

| | | | |
|---|---|---|---|
| 5,749,149 A * | 5/1998 | Claytor | 33/1 F |
| 5,771,598 A * | 6/1998 | Lassberg | 33/494 |
| 6,286,216 B1 * | 9/2001 | Braun | 30/310 |
| 6,349,479 B1 * | 2/2002 | Bottega | 33/481 |
| 6,782,629 B2 * | 8/2004 | Jimenez et al. | 33/483 |
| 6,799,379 B2 * | 10/2004 | Brady | 33/562 |
| 6,895,675 B2 * | 5/2005 | Albright et al. | 33/42 |
| 6,925,724 B2 * | 8/2005 | Tandy | 33/563 |
| 7,000,329 B2 | 2/2006 | Brady | |
| 7,043,850 B2 | 5/2006 | Brady | |
| 7,185,441 B2 * | 3/2007 | Lockyer | 33/562 |
| 7,216,440 B2 * | 5/2007 | Zint | 33/806 |
| 7,383,640 B2 * | 6/2008 | Barry | 33/562 |
| 7,464,480 B2 * | 12/2008 | Vetromila | 33/436 |
| 7,568,295 B1 * | 8/2009 | Strain | 33/566 |
| D601,442 S * | 10/2009 | Haren | D10/64 |
| 7,698,828 B2 * | 4/2010 | Wei | 33/485 |
| 7,721,457 B2 * | 5/2010 | Brady | 33/562 |
| 2004/0143979 A1 * | 7/2004 | Albright et al. | 33/42 |
| 2009/0158602 A1 * | 6/2009 | Lockyer | 33/1 B |
| 2010/0223798 A1 * | 9/2010 | Zimmerman | 33/494 |

* cited by examiner

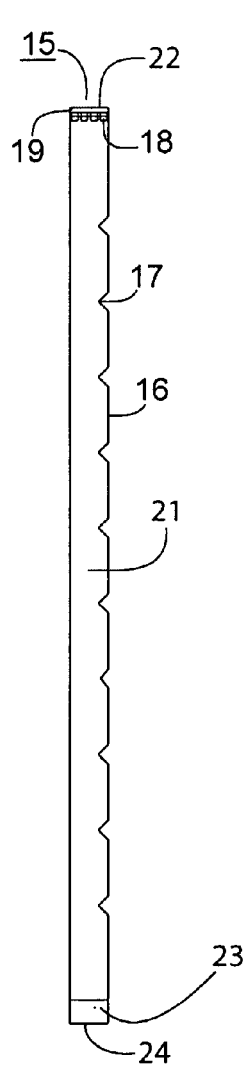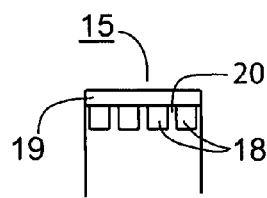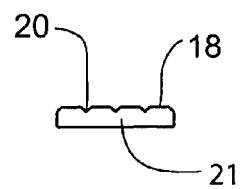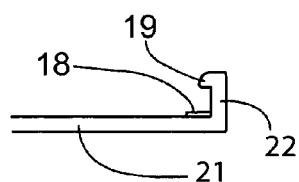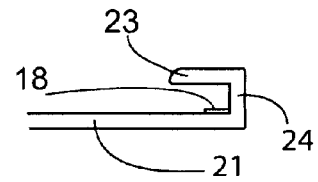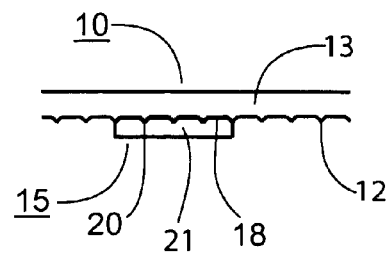

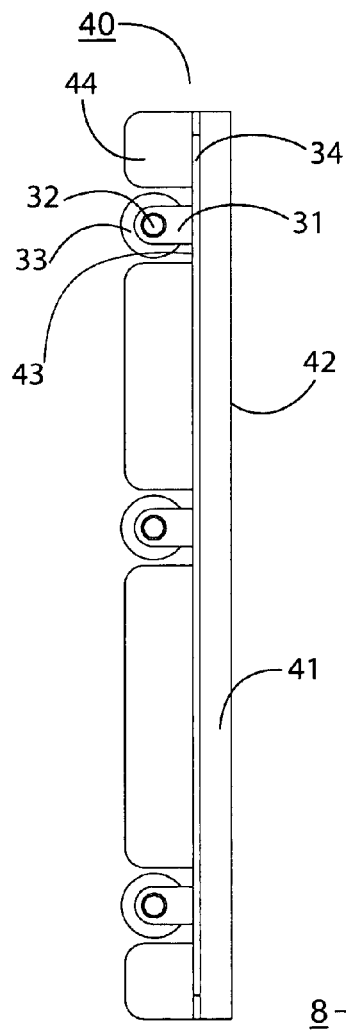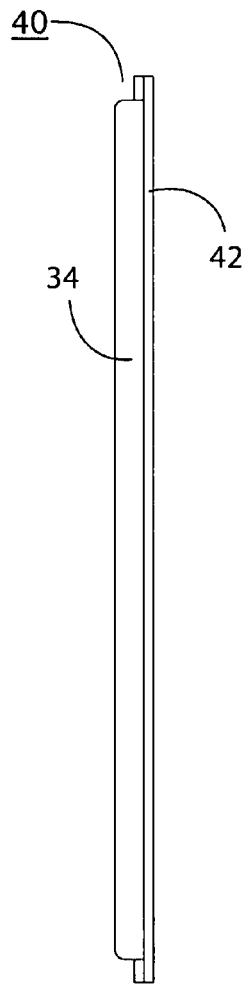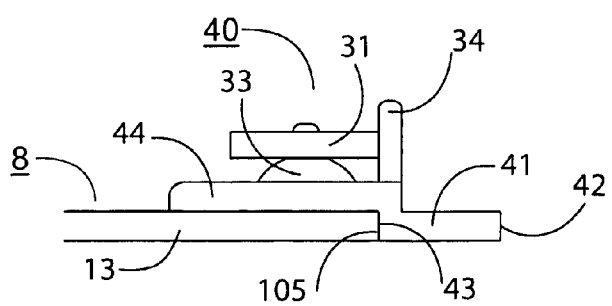

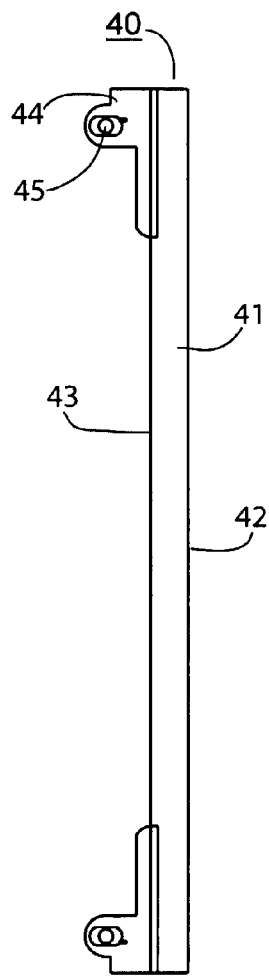
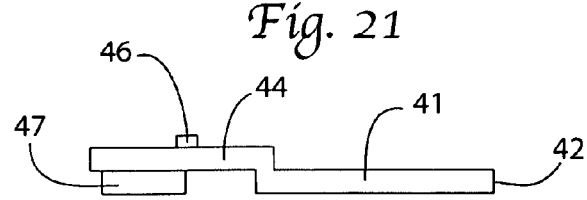
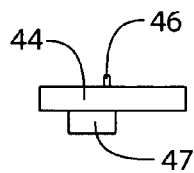
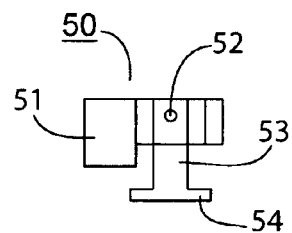
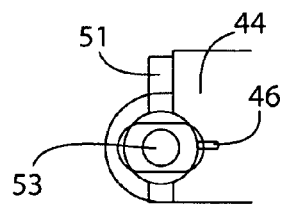
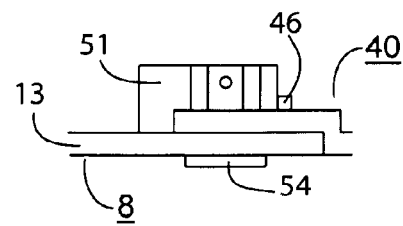
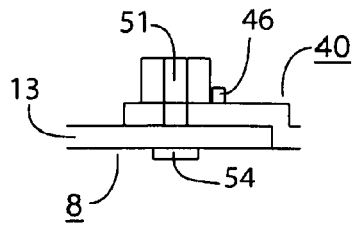

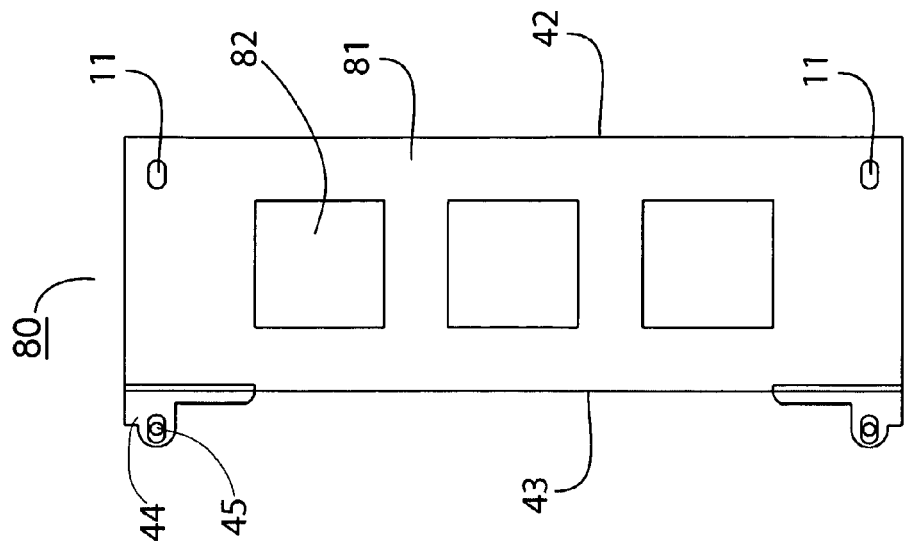
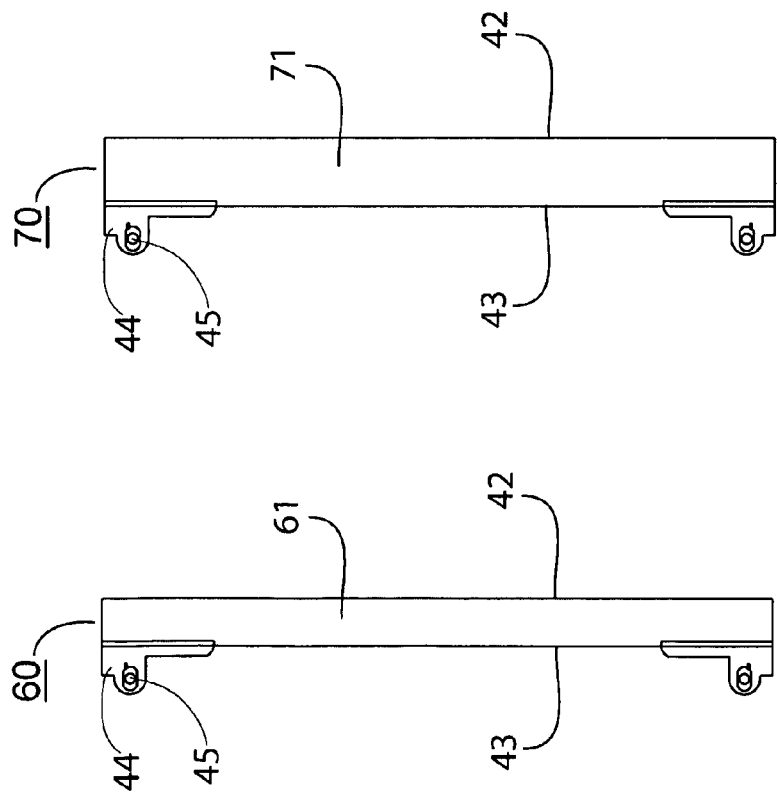

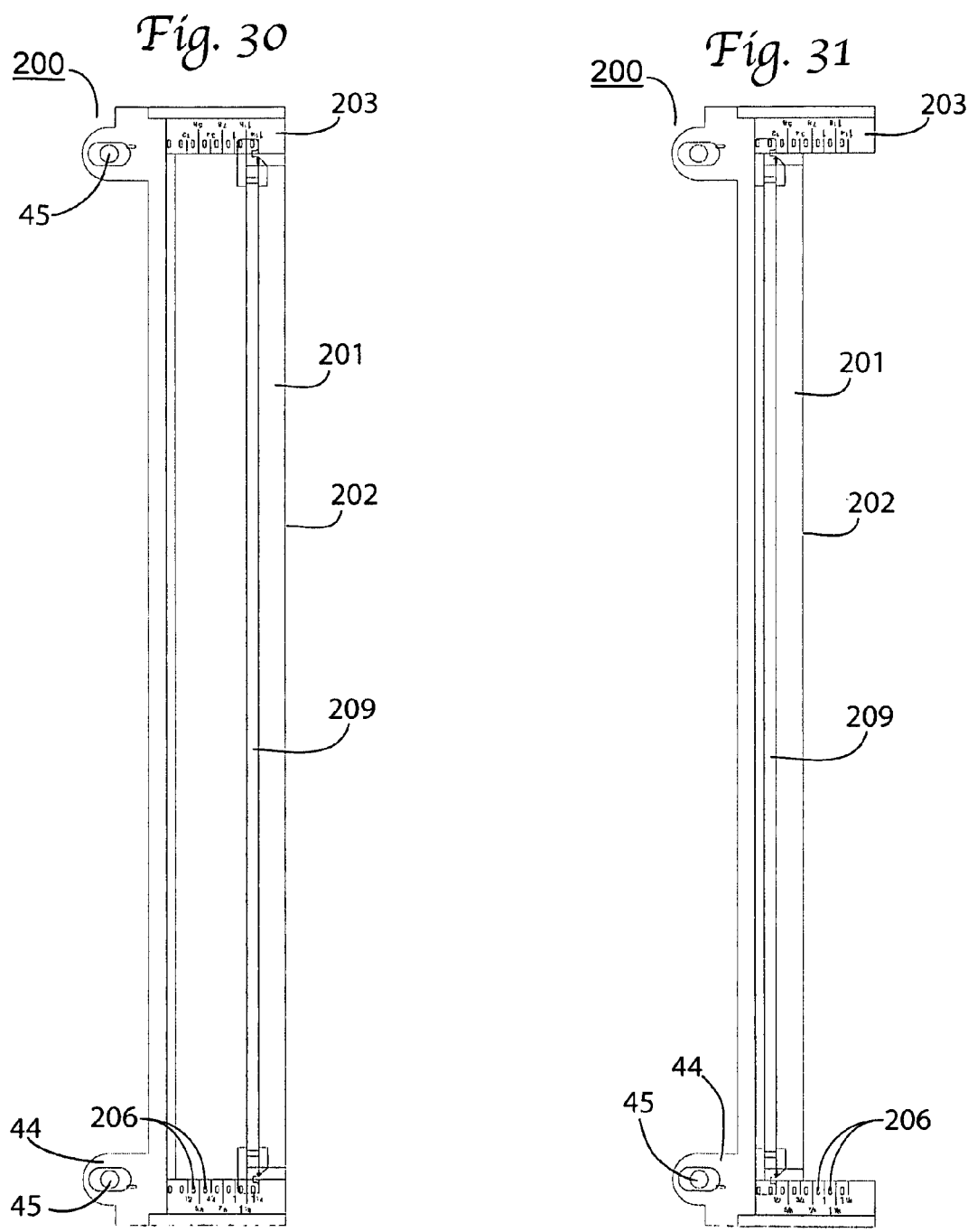

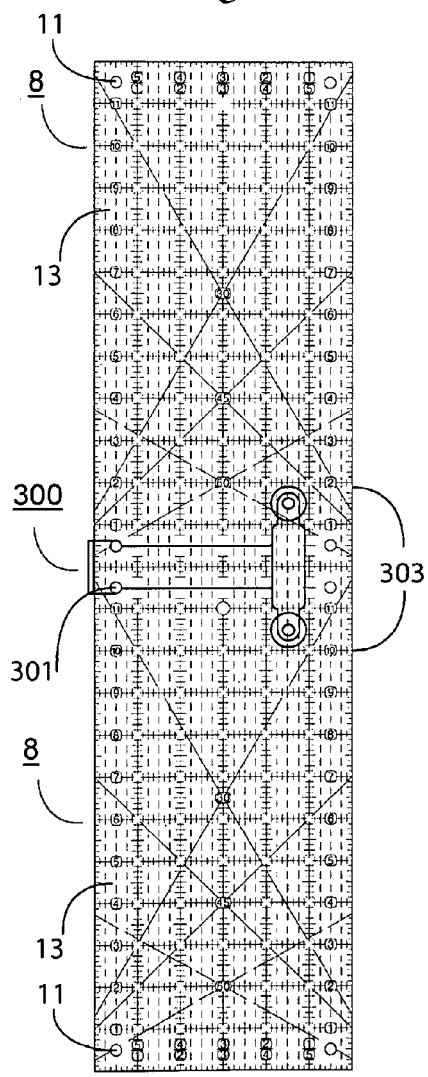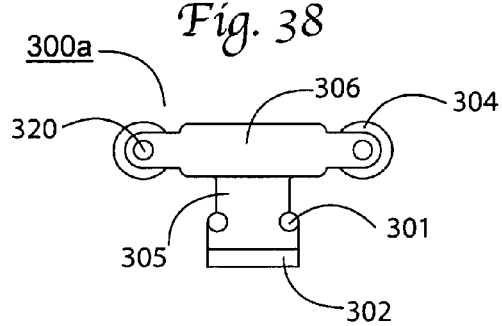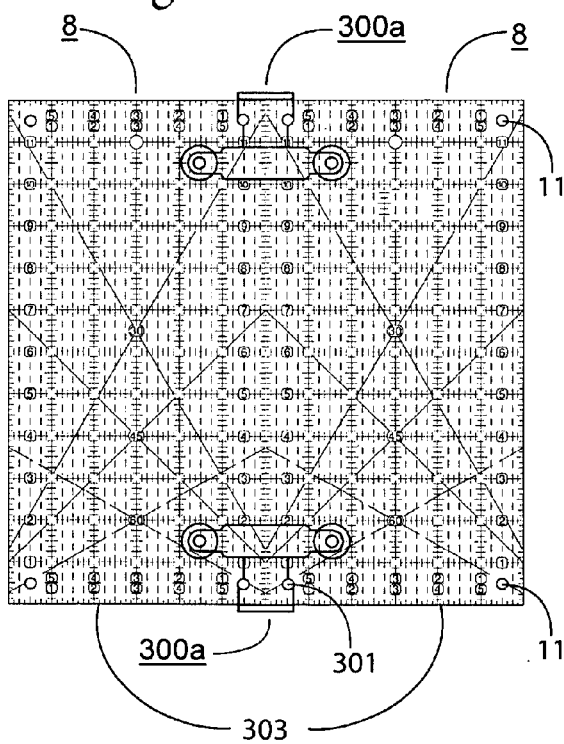

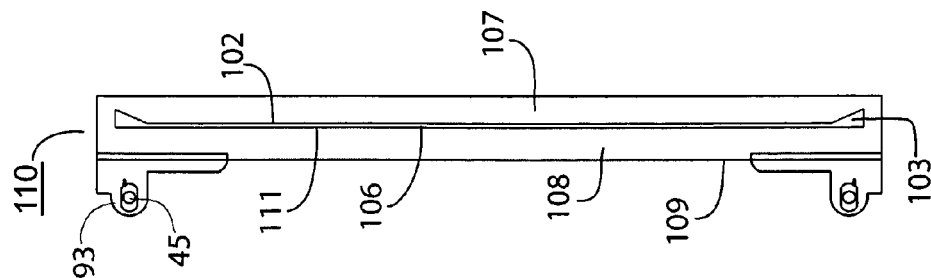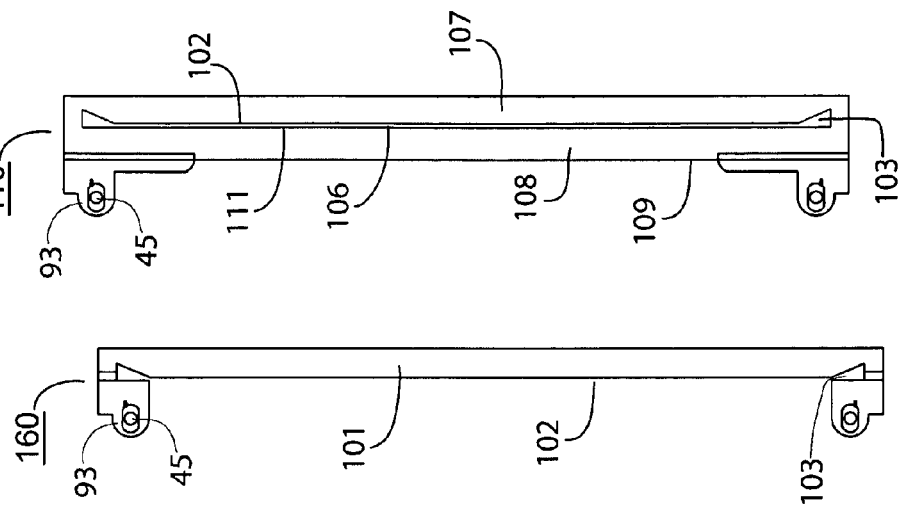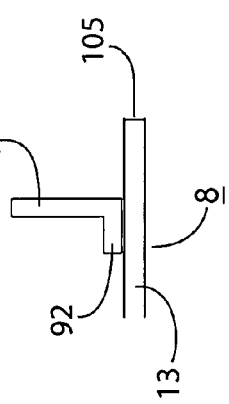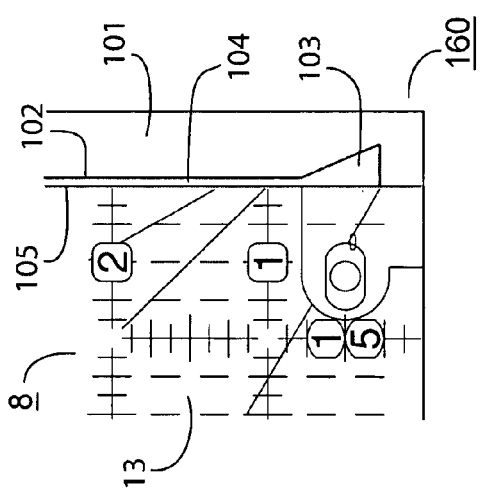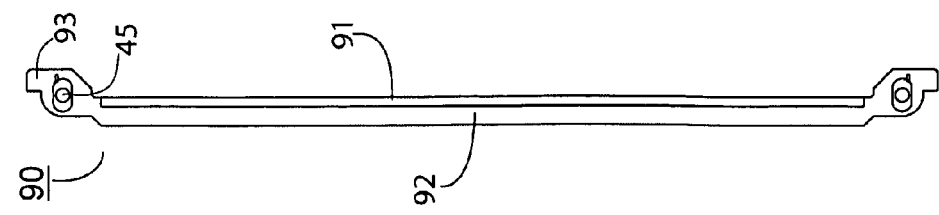

MEASURING DEVICE AND ACCESSORIES FOR PREPARING QUILT PIECES

CROSS-REFERENCE TO RELATED APPLICATIONS

The present Utility patent application claims priority benefit of the U.S. provisional application for patent Ser. No. 60/951,529 filed on Jul. 24, 2007 under 35 U.S.C. 119(e) and entitled "Transparent Measuring Device and Accessories for Preparing Quilt Pieces to be Sewn Together". The contents of this related provisional application are incorporated herein by reference for all purposes.

FEDERALLY SPONSORED RESEARCH OR DEVELOPMENT

Not applicable.

REFERENCE TO SEQUENCE LISTING, A TABLE, OR A COMPUTER LISTING APPENDIX

Not applicable.

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office, patent file or records, but otherwise reserves all copyright rights whatsoever.

FIELD OF THE INVENTION

The present invention relates in general to a measuring device. More particularly, the invention relates to a transparent measuring device that provides a movable guide that can be accurately aligned with any of its measuring lines and provides the ability for various accessories to be connected that can increase its dimensions and provide additional functions such as, but not limited to, automatically including common amounts of seam allowance used in sewing and quilting to its measurements.

BACKGROUND OF THE INVENTION

Crafts such as quilting may require exact measuring and cutting of fabrics. In the past quilters used templates that were the exact size of the piece they needed to cut. Today, quilters generally use measuring devices that are basically rulers made of one-eighth inch thick transparent acrylic that enable them to see through and align the fabric underneath. When they are satisfied that the edge of the fabric is accurately aligned with the measurement line on the measuring device for the width of fabric they need, they typically cut along the edge of the measuring device with a rotary cutting device. While this does enable them to cut pieces of fabric of many different sizes with one tool, standard transparent measuring devices have many disadvantages when used for this purpose. Adapting a ruler to the purpose of quilting necessitates having to pick out one of many similar looking measurement lines every time they measure and cut. Quilt patterns often require multiple pieces of the same size and it is common for even experienced quilters to accidentally line up to the wrong line during the process. Another problem is that the lines on a measuring device do not provide an accurate point with which to align the edge of the fabric. The lines themselves have a certain width and quilters may variously line up the fabric with the inside, outside or middle of the line throughout the measuring and cutting process. Refraction and/or reflection caused by looking through one-eighth inch of plastic can also lead to inaccuracy.

Another problem users experience when using currently known measuring devices is their tendency to slip when the user is trying to hold the measuring device in place with one hand while at the same time applying enough pressure with the other hand to the rotary cutting device to cut through the fabric along the edge of the measuring device. Quilters typically use cutting mats specifically designed to withstand multiple uses of the rotary cutting device on their surface. While cutting, the user needs the measuring device to stay in position on the cutting mat and the fabric to correctly cut the fabric. Current solutions to prevent slipping include adhering self-adhesive vinyl or sandpaper dots to the lower surface of conventional measuring devices; however the vinyl or sandpaper dots provide inadequate coverage, leaving gaps in between where the fabric may not be adequately held. In other solutions, some measuring devices have rough spots embedded on their lower surfaces while other measuring devices have thin vinyl sheets attached to their lower surfaces. The effectiveness of these solutions can depend on where the user's hand is on the measuring device when applying the downward force. If the user's hand is on a portion of the measuring device that has fabric under it, there is nothing applying direct pressure on the portion of the measuring device in contact with the cutting mat in order to aid in holding the measuring device to the cutting mat, and the measuring device may slip. Slippage of the measuring device also increases the chance of the cutting device slipping over the top of the measuring device and possibly causing injury to the user's hand.

There is also the problem of needing to purchase and store multiple measuring devices to be able to measure and cut a broad range of sizes and include the different amounts of seam allowance needed for fabric pieces used in quilting. A recent survey disclosed that the average quilter has six different sizes of measuring devices with many having more than one dozen. There are now many products available that are designed solely to help quilters keep track of and store their measuring devices. The problem is that standard measuring devices are limited in measuring and cutting material to various widths by their own dimensions. For example, the most common widths of a measuring device used for quilting is six or six and one half inches. If the user needs to measure and cut a piece of fabric to a width wider than that, they must purchase an additional, wider measuring device. The wider measuring device would be unwieldy for cutting smaller pieces so the user must purchase and keep track of both. The same problem applies to the length of the measuring device. To cut strips from long pieces of fabric, the user needs a long measuring device; yet when working with shorter pieces, it is typically easier to use a shorter measuring device. Quilters have resorted to methods such as taping two or more smaller rulers together to make a longer measuring device; however, aligning the smaller rulers accurately is difficult. Even if one is able to align the rulers initially, tape is flexible and the rulers can easily come out of alignment.

Quilters also commonly need several different sizes of square measuring devices. Most quilts consist of square blocks sewn together lengthwise and crosswise to form an entire quilt. Quilters generally sew two or more smaller pieces of fabric together into small square units and then groups of these small square units are sewn together to form the larger square blocks. Common units include half or quarter square triangle units made by cutting a square in half once or twice diagonally to form half and quarter square triangles and then sewing the triangles together in various combinations to form multicolored small square units. Quilters commonly have multiple sizes of square measuring devices to use as templates to ensure that these units and blocks are square after being sewn together. For example, a quilter may sew two half-square triangles together to form a two and one-half inch (2½") square. Many quilters will cut the half-square triangles a little larger than necessary because if the triangles are too small to begin with there is no way to add more fabric to the triangles after cutting. By cutting the triangles a little larger, the quilters know they can trim the resulting square down to the correct size. In this example, a quilter typically uses a two and one-half inch (2½") square-measuring device as a template to cut the excess material around the edges of the square. Even though the quilter could use the lines on a larger square measuring device to square-up smaller sizes, many quilters prefer not to have to pick out the particular lines needed, and therefore purchase individual square measuring devices in various sizes such as, but not limited to, two and one-half inch (2½"), four and one-half inch (4½"), six and one-half inch (6½"), eight and one-half inch (2½"), ten and one-half inch (10½"), and twelve and one-half inch (12½").

There are also many measuring devices that incorporate features to aid in adding a seam allowance to the measurement. The seam allowance is the amount of fabric that is taken up in joining the individual pieces by sewing. The joined portions are typically located on the inside of a quilt once the quilt is finished and therefore do not add to the dimensions of the quilt. Quilters refer to pieces as the unfinished size before they are joined together and as the finished size after they are joined together. To include the most common amounts quilters add for the seam allowance, some measuring devices add one-half inch while others add seven-eighths of an inch and still others add one and one-quarter inch on one or two sides of the measuring device. This enables a user to line the edge of the fabric up to a measurement line on the measuring device that represents the finished size of the piece they are making and include the extra amount needed for the seam allowance. The problem with these solutions is that the user must be sure they are using the right measuring device and also that the measuring device is turned the right way to add the right amount of seam allowance for the piece they are cutting. This also adds to the number of measuring devices needed and creates the possibility of using the wrong measuring device and ending up with an incorrectly sized piece. There are also measuring devices formed to cut decorative edges such as, but not limited to, scallop or saw-tooth edges that add even more devices the user must store and keep track of.

Another problem that many quilters encounter is that even when the edge of the fabric is accurately aligned with the marks on the measuring device, the quilters may have trouble keeping the rotary cutting device's blade consistently against the edge of the measuring device and at the correct angle to provide accurate cuts.

In view of the foregoing, there is a need for improved techniques for providing an easy to use measuring device that provides an adjustable guide that can be easily and accurately aligned with a desired measurement line on the measuring device and that gives the user a precise point to line the edge of the fabric up to, for example, without limitation, the edge of the guide. There is also a need for square versions of these measuring devices that include guides that move perpendicular to each other for squaring up various sizes. The measuring device should also provide non-slip frictional strips that make it easy for the user to hold the fabric in place under the measuring device and the measuring device in place on the cutting surface. It would also be beneficial for the measuring device to provide the capability of easily aligning and connecting one or more measuring devices together and/or easily attaching accessories that can add to the width and/or length of the measuring device including, without limitation, accessories that add the additional width needed to accommodate for various common seam allowances. Other possible attachable accessories may include, without limitation, a cutting edge shaped to cut various decorative edges, an extension to provide a barrier between the cutting device used along the edge of the measuring device and the user's hand and fingers holding the measuring device in place, or an extension formed on any of the other various accessories that extend the width of the measuring device and provide a thin opening, or slot, between the desired cutting edge and the inside edge of the extension. Using an extension with a slot, a user could insert the blade of a rotary cutting device into the slot that would act as a guide for the blade of the rotary cutting device thereby ensuring that the blade remains accurately aligned along the edge of the measuring device.

BRIEF DESCRIPTION OF THE DRAWINGS

The present invention is illustrated by way of example, and not by way of limitation, in the figures of the accompanying drawings and in which like reference numerals refer to similar elements and in which:

FIGS. 2 through 7 illustrate an exemplary movable material alignment guide, in accordance with an embodiment of the present invention. FIG. 2 is a top view of the movable material alignment guide. FIG. 3 is a detailed view of a top end of the movable material alignment guide. FIG. 4 is a cross sectional view of the movable material alignment guide. FIG. 5 is a side view of the top end of the movable material alignment guide. FIG. 6 is a side view of a bottom end of the movable material alignment guide, and FIG. 7 is a cross sectional view of the movable material alignment guide attached to a measuring device;

FIG. 10 is a side view of tab attached to an elongate strip, FIG. 11 is a front view of tab attached to elongate strip, FIG. 12 is a side view of tab with attaching means, and FIG. 13 is a front view of tab with a locking mechanism attached;

FIG. 15 is a bottom perspective view, and FIG. 16 is a front view;

FIGS. 17 through 19 illustrate an exemplary width-extending accessory for a measuring device, in accordance with an embodiment of the present invention. FIG. 17 is a top view, FIG. 18 is a side view, and FIG. 19 is a front view of the width-extending accessory attached to an edge of a planar structure of a measuring device;

FIGS. 20 and 21 illustrate an exemplary width-extending accessory for a measuring device, in accordance with an embodiment of the present invention. FIG. 20 is a top view, and FIG. 21 is a front view. Various components shown in the Figures will separately be illustrated by way of an exemplary close up view in subsequently described FIGS. 22 through 26 with reference continually to FIGS. 20 and 21;

FIG. 22 is a side view of an exemplary raised portion of a width-extending accessory, in accordance with an embodiment of the present invention;

FIGS. 23 through 26 illustrate an exemplary locking mechanism for a width-extending accessory of a measuring device, in accordance with an embodiment of the present invention. FIG. 23 is a front cross sectional view. FIG. 24 is a top view of the locking mechanism attached to a raised portion of the width-extending accessory. FIG. 25 is a front view of the locking mechanism, the width-extending accessory and the measuring device in an unlocked position, and FIG. 26 is a front view of the locking mechanism, the width-extending accessory and the measuring device in a locked position;

FIGS. 27 through 29 illustrate exemplary width-extending accessories in varying sizes, in accordance with embodiments of the present invention. FIG. 27 illustrates a narrow width-extending accessory, FIG. 28 illustrates a slightly wider width-extending accessory, and FIG. 29 illustrates an even wider width-extending accessory;

FIGS. 30 through 32 illustrate an exemplary adjustable width-extending accessory for use with a measuring device, in accordance with an embodiment of the present invention. FIGS. 30 and 31 are top views with the adjustable width-extending accessory in an extended and retracted position, respectively, and FIG. 32 is a close-up view of an end of the adjustable width-extending accessory;

FIG. 33 is a front view, and FIG. 34 is a side cross sectional view of the locking mechanism attached to a vertical extension of the adjustable width-extending accessory;

FIGS. 35 through 37 illustrate an exemplary connector accessory to connect two or more measuring devices, in accordance with an embodiment of the present invention. FIG. 35 is a top view of the connector accessory. FIG. 36 is a cross sectional view of the connector accessory attached to a measuring device, and FIG. 37 is a top view of the connector accessory connecting two measuring devices;

FIGS. 38 and 39 illustrate an exemplary connector accessory for connecting two or more measuring devices together, in accordance with an embodiment of the present invention. FIG. 38 is a top view of the connector accessory, and FIG. 39 is a top view of two connector accessories connecting two measuring devices;

FIG. 40 is a side cross sectional view of the connector accessory attached to the measuring device with the locking mechanism in an unlocked position. FIG. 41 is a side cross sectional view of the connector accessory attached to the measuring device with the locking mechanism in a locked position. FIG. 42 is a front cross sectional view of the connector accessory, and FIG. 42 is a top view of the connector accessory;

FIGS. 44 and 45 illustrate an exemplary barrier device for use with a measuring device, in accordance with an embodiment of the present invention. FIG. 44 is a top view of the barrier device, and FIG. 45 is a cross sectional view of the barrier device attached to the measuring device;

FIGS. 46 and 47 illustrate an exemplary blade-guiding accessory for use with a measuring device, in accordance with an embodiment of the present invention. FIG. 46 is a close-up view of an end of the blade-guiding accessory attached to the measuring device, and FIG. 47 is a top view of the blade-guiding accessory;

FIG. 48 illustrates an exemplary blade-guiding accessory for use with a measuring device, in accordance with an embodiment of the present invention;

FIG. 50 is a top view, FIG. 51 is a side view, FIG. 52 is a front view, FIG. 53 is a rear view, and FIG. 54 is a top view of the material alignment guide attached to the square measuring device.

Figure 1:
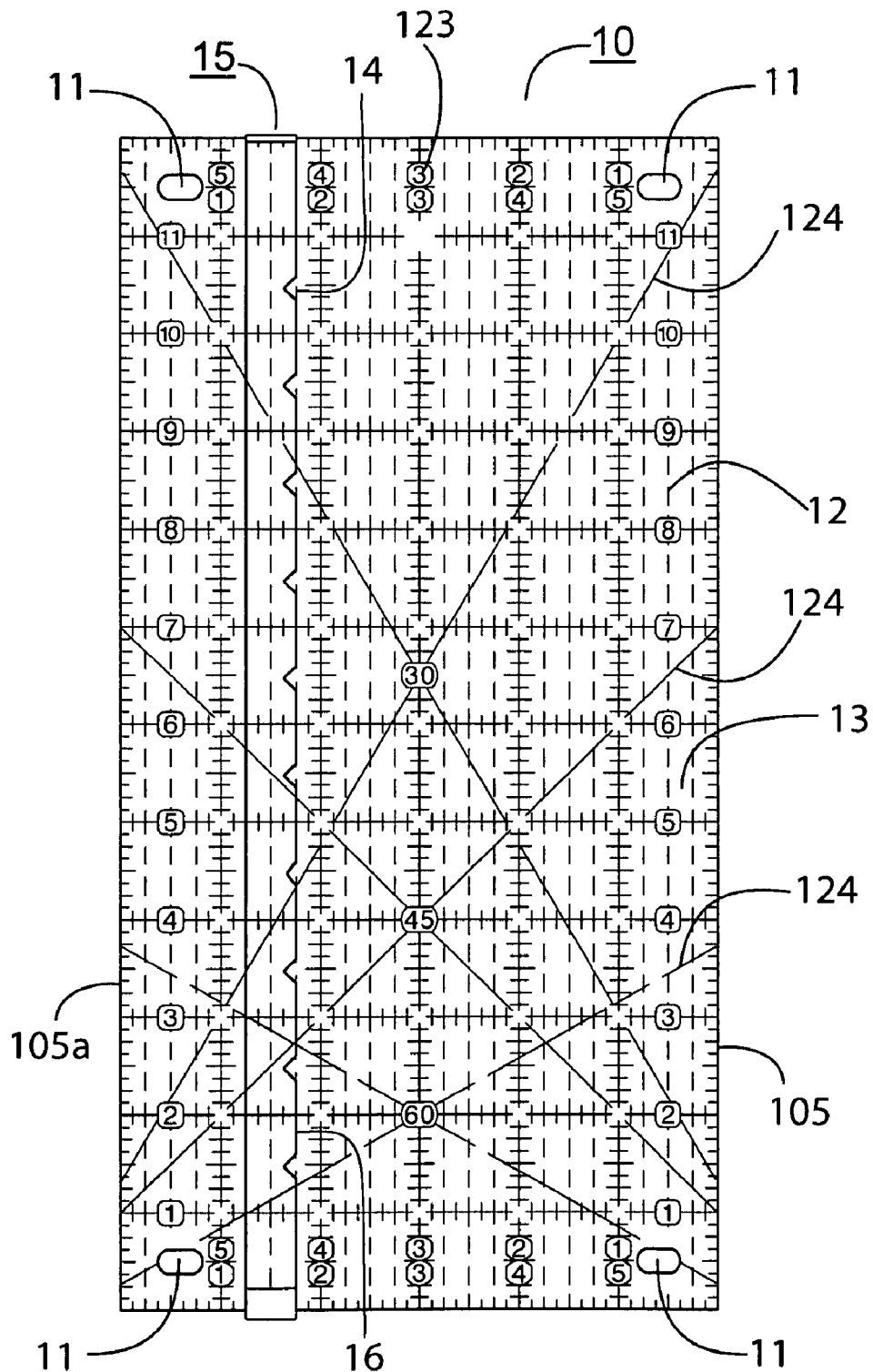
FIG. 1 illustrates an exemplary measuring device with a movable material alignment guide, in accordance with an embodiment of the present invention.

Unless otherwise indicated illustrations in the figures are not necessarily drawn to scale.

SUMMARY OF THE INVENTION

To achieve the forgoing and other objects and in accordance with the purpose of the invention, a measuring device and accessories for preparing quilt pieces is presented.

In one embodiment, a transparent measuring apparatus for material is presented. The apparatus includes a planar structure including a top surface, bottom surface, a left edge, a right edge, a top end, a bottom end and at least one hole for attachment of accessories. A plurality of measurement lines is formed on at least one of the top and bottom surfaces. A material alignment guide is removably attached to the bottom surface. The material alignment guide includes a first edge for aligning the material and is configured for moveably aligning the first edge with the measurement lines. Protrusions extend below the bottom surface and adjacent to the left and right edges. The protrusions extend a sufficient distance from the bottom surface to facilitate movement of the material alignment device when the protrusions are placed on a flat surface. At least one first accessory is attachable to the planer structure wherein the first accessory adds width to the planer structure. At least a second accessory is attachable to the planer structure wherein the second accessory adds length to the planer structure. At least a third accessory is attachable to the planer structure wherein the third accessory provides a safety barrier when cutting along an edge of the planer structure. At least a fourth accessory is attachable to the planer structure wherein the fourth accessory provides a slot for guiding cutting along an edge of the planer structure. In another embodiment the material alignment guide includes an elongate strip and the first edge includes notches for viewing a proper alignment of the material with the first edge. In another embodiment the plurality of measurement lines includes raised ribs protruding from the bottom surface. In still another embodiment the material alignment guide includes an elongate strip of a flexible material including a top strip end including a top hook, a bottom strip end including a bottom hook wherein the bottom hook can be attached to the bottom end and the top hook can be attached to the top end by flexing the strip. In yet another embodiment the material alignment guide includes teeth positioned proximate to at least one of the top and bottom strip ends, the teeth including spaces for engaging the raised ribs wherein the first edge of the material alignment guide can be accurately aligned with a one of the measurement lines. In another embodiment the material alignment guide includes teeth positioned proximate to the top and bottom strip ends, the teeth including spaces for engaging the raised ribs wherein the first edge of the material alignment guide can be accurately aligned along its length with a one of the measurement lines. In other embodiments the planer structure includes at least one narrow slot perpendicular to the left and right edges and the elongate strip includes a tab for insertion up through the narrow slot from the bottom surface. In still another embodiment the planer structure further includes at least one channel on the top surface perpendicular to the left and right edges, the channel including a plurality of notches. In yet another embodiment the tab further includes means for attaching a locking mechanism, the locking mechanism including at least one tooth for engaging the plurality of notches in the channel wherein the first edge of the material alignment guide can be aligned with a one of the measurement lines. In other embodiments the planer structure includes at least one window perpendicular to the left and right edges and the elongate strip includes at least two tabs for insertion up through the window from the bottom surface, each of the tabs including a hook for attaching to opposing sides of the window. In still another embodiment at least one of the opposing sides includes notches and one of the tabs includes at least a tooth for engaging the notches wherein the first edge of the material alignment guide can be aligned with a one of the measurement lines. Yet another embodiment further includes frictional strips joined to the bottom surface and adjacent to the left and right edges, the frictional strips extending a sufficient distance from the bottom surface to facilitate movement of the material alignment device and the frictional strips increasing a gripping force of the measuring apparatus to an underlying work surface and the material.

In another embodiment a transparent measuring apparatus for material is presented. The apparatus includes a planar structure including a top surface, bottom surface, a left edge, a right edge, a top end, a bottom end and at least two holes for attachment of accessories. A plurality of measurement lines is formed on at least one of the top and bottom surfaces. A material alignment guide is removably attached to the bottom surface. The material alignment guide includes a first edge for aligning the material and is configured for moveably aligning the first edge with the measurement lines. Protrusions extend below the bottom surface and adjacent to the left and right edges. The protrusions extend a sufficient distance from the bottom surface to facilitate movement of the material alignment device when the protrusions are placed on a flat surface. At least one width extending accessory is attachable to the planer structure wherein the width extending accessory adds width to the planer structure. Another embodiment further includes frictional strips joined to the bottom surface and adjacent to the left and right edges, the frictional strips extending a sufficient distance from the bottom surface to facilitate movement of the material alignment device and the frictional strips increasing a gripping force of the measuring apparatus to an underlying work surface and the material. In another embodiment the first edge of the material alignment guide includes notches for viewing a proper alignment of the material with the first edge. In another embodiment the width extending accessory includes a planer structure extension including an inside edge, an outside edge, a first end a second end and an extension width. A first raised portion is proximate the first end and a second raised portion proximate the second end. The first and second raised portions include lower surfaces extending away from the planer structure extension at the inside edge. Extended bottom portions extend from the lower surfaces. The extended bottom portions have dimensions for fitting into the two holes of the planer structure. A locking hole is formed through each of the first and second raised portions and the extended bottom portions. A locking mechanism is provided for securing the width extending accessory to the planer structure. The locking mechanism includes a cylinder that can rotate within the locking hole. I yet another embodiment the cylinder includes a flanged bottom portion and a lever joined to a top of the cylinder for rotating the cylinder. In a further embodiment the cylinder can be rotated from an unlocked position to a locked position where, when the cylinder is in the unlocked position, the flanged bottom is oriented for fitting through one of the two holes in the planer structure and, when the cylinder is in the locked position, the flanged bottom is oriented such that the bottom surface of the planer structure restrains the flanged bottom and the width extending accessory is secured to the planer structure. In another embodiment the planer structure extension further includes at least one hole for attachment of accessories. In other embodiments a width of the width extending accessory is a fixed width of the extension width and the material can be cut along the outside edge and the fixed width is a standard seam allowance. In yet another embodiment a width of the width extending accessory is adjustable. The first and second raised portions further extend across the planer structure for an adjustment distance greater than the extension width and the outside edge is movable within an adjustment range from the extension width to proximate the adjustment distance. In still another embodiment the first and second raised portions further include means for indicating a position of the outside edge within the adjustment range. Another embodiment further includes means for locking the outside edge in positions within the adjustment range.

In another embodiment a transparent measuring apparatus for material is presented. The apparatus includes a square planar structure including a top surface, bottom surface, a left edge, a right edge, a top edge, and a bottom edge. A plurality of horizontal and vertical measurement lines at equal increments of distance is formed on at least one of the top and bottom surfaces. A diagonal line is formed on the surface of the measurement lines. A plurality of holes is formed through the planer structure along the horizontal and vertical measurement lines. A first material alignment guide is removably attachable to the bottom surface. The first material alignment guide including a first edge for aligning the material and a raised portion for engaging at least one of the holes for aligning the first edge with a one of the measurement lines. In another embodiment holes along the horizontal lines are below the diagonal line and holes along the vertical lines are above the diagonal line. In still another embodiment, when the first material alignment guide is attached to at least one hole along the horizontal lines, the first edge faces the top edge and when the first material alignment guide is attached to at least one hole along the vertical lines, the first edge faces the right edge. Yet another embodiment further includes a second material alignment guide removably attachable to the bottom surface. The second material alignment guide including a second edge for aligning the material and a raised portion for engaging at least one of the holes for aligning the second edge with a one of the measurement lines. Still another embodiment further includes a third material alignment guide removably attachable to the bottom surface. The third material alignment guide including third and fourth edges for aligning the material and at least two raised portions for engaging at least one of the horizontal and at least one of the vertical holes for aligning the third and fourth edges with measurement lines to define a corner of a square. In another embodiment when the first, second and third material alignment guides are attached to the bottom, the first, second, third and fourth edges define a corner and adjacent sides of a square. In other embodiments the first, second, third and fourth edges include notches for viewing a proper alignment of the material and the holes and the raised portions are oval in shape.

In another embodiment a transparent measuring apparatus for material is presented. The apparatus includes a planar structure including a top surface, bottom surface, a left edge, a right edge, a top end, a bottom end and a plurality holes for attachment of accessories. A plurality of measurement lines is formed on at least one of the top and bottom surfaces. A material alignment guide is removably attached to the bottom surface. The material alignment guide includes a first edge for aligning the material and is configured for moveably aligning the first edge with the measurement lines. Protrusions extend below the bottom surface and adjacent to the left and right edges. The protrusions extend a sufficient distance from the bottom surface to facilitate movement of the material alignment device when the protrusions are placed on a flat surface. Another embodiment further includes frictional strips joined to the bottom surface and adjacent to the left and right edges, the frictional strips extending a sufficient distance from the bottom surface to facilitate movement of the material alignment device and the frictional strips increasing a gripping force of the measuring apparatus to an underlying work surface and the material. In another embodiment the first edge of the material alignment guide includes notches for viewing a proper alignment of the material with the first edge. Yet another embodiment further includes means for locking the material alignment guide where the first edge is accurately aligned with one of the measurement lines. Other embodiments further includes at least one accessory attachable to the planer structure wherein the accessory adds width to the planer structure and the added width is a standard seam allowance. In still another the accessory joins the planer structure to a second planar structure including a top surface, bottom surface, a left edge, a right edge, a top end, a bottom end and a plurality holes for attachment of accessories. In a further embodiment the accessory includes extensions shaped to fit in the holes in the planer structure and the second planer structure. In yet another accessory includes a plurality of suction cups for adhering to the top surfaces. Another embodiment further includes at least one accessory attachable to the planer structure wherein the accessory adds length to the planer structure. In another embodiment the accessory joins the planer structure to a second planar structure including a top surface, bottom surface, a left edge, a right edge, a top end, a bottom end and a plurality holes for attachment of accessories. In yet another embodiment the accessory includes extensions shaped to fit in the holes in the planer structure and the second planer structure. In still another embodiment the accessory includes a plurality of suction cups for adhering to the top surfaces. Another embodiment further includes at least one accessory attachable to the planer structure wherein the accessory provides a safety barrier when cutting along an edge of the planer structure. Yet another embodiment further includes at least one accessory attachable to the planer structure wherein the accessory provides a slot for guiding cutting along an edge of the planer structure.

In another embodiment a transparent measuring apparatus for material is presented. The apparatus includes a planar structure including a plurality holes for attachment of accessories, means for forming measurement lines on the planer structure, means for aligning the material with the measurement lines and means for supporting the planer structure on a flat surface. Another embodiment further includes means for increasing a gripping force of the measuring apparatus to an underlying work surface and the material. Yet another embodiment further includes means for adding width to the planer structure. Still another embodiment further includes means for adding length to the planer structure. Another embodiment further includes means for adding a safety barrier along an edge of the planer structure. Yet another embodiment further includes means for guiding cutting along an edge of the planer structure.

Other features, advantages, and object of the present invention will become more apparent and be more readily understood from the following detailed description, which should be read in conjunction with the accompanying drawings.

DETAILED DESCRIPTION OF THE PREFERRED EMBODIMENTS

The present invention is best understood by reference to the detailed figures and description set forth herein.

Embodiments of the invention are discussed below with reference to the Figures. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described and shown. That is, there are numerous modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

The present invention will now be described in detail with reference to embodiments thereof as illustrated in the accompanying drawings.

A preferred embodiment of the present invention provides a transparent measuring device for measuring and cutting material comprising a planar structure, a plurality of measurement lines, a movable material alignment guide, non-slip frictional strips and various accessories that can extend the width and/or length of the measuring device. Herein the term material is used to describe various materials that may be measured and cut using embodiments of the present invention including, without limitation, fabric, paper, cardboard, plastic, photographs, acrylic, cardboard, etc. Other accessories for preferred embodiments may include, without limitation, accessories with decorative edges and accessories that provide a barrier between the cutting device and the user's hand that is holding the measuring device in place. Another exemplary accessory for preferred embodiments provides a narrow slot that guides the cutting blade along the edge of the measuring device.

A movable material alignment guides in one embodiment may comprise an elongate strip with a straight front edge that can be aligned with any of the measurement lines on the lower surface of the planar structure of the measuring device. In one exemplary embodiment the movable material alignment guide is fabricated of translucent or opaque material such as, but not limited to, plastic or acrylic. The elongate strip may be approximately the same length as the measuring device on which it is used, and may vary in width and thickness, for example, without limitation, the elongate strip may be one-eighth inch (⅛") to one-half inch (½") wide and from 20 to 120 thousandths of an inch thick. A measuring device according to preferred embodiments further provides a space underneath the measuring device so it will lay flat on a work surface when the movable material alignment guide is attached underneath the planar structure, which by itself would cause the planar structure of the measuring device to tilt or rock on a flat surface. This can be accomplished, for example, without limitation, by having lips or rims that protrude from the lower surface of the planar structure along the edges. The lips protrude the same distance from the lower surface, for example, without limitation, 20 to 120 thousandths of an inch, as the thickness of the elongate strip of the movable material alignment guide so that the lower surface of the guide and the lower surfaces of the lips on the edges of the planar structure describe a plane. One preferred embodiment of the present invention provides this ability by including non-slip frictional strips along the edges of the lower surface of the planar structure of the measuring device that are approximately the same thickness as the elongate strip.

In one exemplary embodiment, the ends of the material alignment guide may be formed so that they can be pressed on and frictionally held to the ends of the planar structure therefore making it possible to be movably attached under the lower surface of the measuring device so the material alignment guide can be lined up with any of the measurement lines on the measuring device. In some embodiments, the measuring device and material alignment guides may also be formed to include complementary holes or slots and pins or tabs so that the pins or tabs fit into the holes or slots on either device to generally ensure accurate alignment of the material alignment guide with the measurement lines on the measuring device.

One exemplary embodiment of the measuring device may also include at least one narrow slot that comprises an opening, or aperture that extends through the planar structure of the measuring device parallel to its ends and starting and ending near each edge. In this embodiment, the material alignment guide may include at least one extension or tab that protrudes vertically from the upper surface of its elongate strip that fits up through the narrow slot from the lower surface of the planar structure. The extension from the elongate strip may have a wider portion at its top that can be pressed through the narrow slot thereby holding the upper surface of the elongate strip against the lower surface of the planar structure while allowing the elongate strip to slide back and forth underneath. There may also be a wider opening or window and at least two tabs that may be inserted through the window so that each tab is on opposite elongate edges of the window with the top of the tabs being wider on one side so as to hook over the upper surface of the planar structure. The window's elongate edges may also be formed to include notches at even intervals such as, but not limited to, every one-eighth inch (⅛") along its length. The tabs may include complementary parts, or teeth, that engage with the notches around the window. The user can squeeze the two tabs towards the middle of the window so that the teeth disengage from the notches freeing the material alignment guide to move underneath the measuring device. When the front edge of the material alignment guide is aligned with a desired measurement line on the measurement device, the user can release the tabs, which causes the teeth to engage with the notches around the window thereby keeping the front edge of the material alignment guide aligned with the measurement line. It is to be appreciated that the teeth may engage with the notches by various other methods such as, but not limited to, moving up and down vertically in and out of the notches or there may be a gear that can be rotated to move the guide. There may also be holes and pins formed instead of notches and teeth to lock the material alignment guide in place.

In one preferred embodiment, the measurement lines of the measuring device are formed as raised ribs that protrude from the lower surface of the planar structure by 10 to 40 thousandths of an inch. The material alignment guide is formed so that at least a portion of the upper surface of its elongate strip includes raised extensions or teeth that protrude by the same amount as the raised rib measurement lines and are in arrangement so that they can engage within the spaces between the raised rib measurement lines and therefore the raised rib measurement lines are also engaged within the spaces between the teeth on the upper surface of the elongate strip. When the material alignment guide is attached to the planar structure so that the upper surface of the elongate strip is against the lower surface of the planar structure and the ends of the material alignment guide are frictionally or otherwise attached to the ends of the planar structure, the raised rib lines and teeth are engaged with each other. Furthermore, the teeth on the upper surface of the elongate strip are arranged so that the front edge of the material alignment guide is even with and parallel to one of the measurement lines on the measuring device.

Another exemplary embodiment may be in the form of a square-measuring device that comprises windows or apertures through the planar structure of the square-measuring device. Material alignment guides may be frictionally or otherwise held in place within the windows with their front edges in alignment with one of the measurement lines formed on the lower surface of the square planar structure of the square-measuring device. The square measuring device may further comprise measurement markings in arrangement with the measurement lines that denote units of measurement, such as, but not limited to, every inch (1") or half-inch (½") along two adjacent edges of the square measuring device. Each measurement line may be a continuous line or parts of a line that are a consistent distance from at least one edge of the planar structure.

In one exemplary embodiment of a square measuring device there are two sets of measurement lines wherein the first set is parallel to two opposing edges of the planar structure and the second set is parallel to the remaining two opposing edges. The two sets of measurement lines are therefore perpendicular to each other. The square-measuring device of this embodiment further comprises at least one opening, aperture or window formed through the planar structure. The opening may be any shape or size and is arranged so at least one of the measurement lines stops at one edge of the opening and continues at the other edge. Preferably the opening is in a non-symmetrical shape such as, but not limited to, a triangle, rectangle or polygon. In one preferred embodiment the opening is a rectangle or oval so that its length is greater than its width. In some embodiments, there may be plural openings in two sets each being arranged with one set of the perpendicular measurement lines in increments, for example, without limitation, every inch (1") or every half-inch (½"). Therefore each opening is perpendicular to the openings that are aligned with a measurement line of the other set. For example, without limitation, one opening may be at a position so that a guide can be inserted into the opening with the front edge of the guide aligned with a measurement line that is two and one-half inches (2½") from one edge of the square-measuring device. Another opening may be at a position so that a guide can be inserted into the opening with the front edge of the guide aligned with the two and one-half inch (1½") line that is perpendicular to the first two and one-half inch (2½") line. The result is that the front edges of the two guides outline two adjacent edges of a two and one-half inch (2½") square with the edges of the square-measuring device opposite the front edges of the guides forming the other two edges. This enables the user to square up a sewn unit to an accurate two and one-half inch (2½") square size. By inserting the guides into other windows the user may outline other sizes of squares and therefore square up sewn units of various sizes with one square-measuring device.

In one exemplary embodiment, the square-measuring device is twelve and one-half inches (12½") square. The openings are spaced in pairs that are perpendicular to each other and in one-inch (1") increments along two sides of adjacent edges of the square-measuring device. Putting the guides in the first set of holes causes the front edges of the guides to align with the two perpendicular two and one-half inch (2½") measurement lines on the square-measuring device. Placing the guides in the next set of holes aligns the front edges of the guides with the two perpendicular three and one-half inch (3½") measurement lines. Placing the guides in each consecutive set of perpendicular holes enables the user to square up sewn units, in one inch increments, from two and one-half inches (2½") to eleven and one-half inches (11½") thereby eliminating the need for many separate square measuring devices. Those skilled in the art, in light of the present teachings, will readily recognize that there is a multiplicity of suitable sizes for square-measuring devices according to embodiments of the present invention.

In preferred embodiments, non-slip frictional strips may be formed on or attached to the lower surface of the planar structure along each edge. In one exemplary embodiment, the non-slip frictional strips are fabricated from material such as, but not limited to, vinyl, rubber or synthetic rubber and are from 20 to 120 thousandths of an inch thick and therefore protrude from the lower surface of the planar structure. When the planar structure is placed on a cutting mat that is on a flat surface such as, but not limited to, a table, the lower surfaces of the non-slip frictional strips contact the cutting mat therefore suspending the lower surface of the planar structure between the non-slip frictional strips slightly above the cutting mat. This provides a space for the movable material alignment guide under the planar structure so the measuring device does not rock or tilt when used on a flat surface. Furthermore when a user presses down on the upper surface of the measuring device anywhere between the non-slip frictional strips, the resultant downward force is concentrated on the smaller surface areas of the lower surfaces of the non-slip frictional strips. This provides more pressure per square inch that is applied to a more frictional material than the lower surface of the planar structure itself. When utilizing a transparent measuring device and rotary cutting device to cut quilt pieces, it is common to have one edge of the material lined up to a measurement line underneath the measuring device so that one edge of the measuring device is on the material and the other edge of the measuring device is on a cutting mat. Because the non-slip frictional strips are near the edges of the measuring device in preferred embodiments, these embodiments generally ensure that the downward force applied is concentrated on the lower surface of the non-slip frictional strip that is over the material along the edge where the user is cutting and on the lower surface of the non-slip frictional strip on the opposite edge of the measuring device where there is no material between the lower surface of the non-slip frictional strip and the cutting mat. This generally ensures that the measuring device grips the material and cutting mat with greater force and more consistently than with currently known solutions.

In preferred embodiments, the measuring device may be formed so that various accessories can be attached to the measuring device. Accessories may include, but are not limited to, those that can be attached to the edges of the measuring device thereby extending the width of the measuring device and other accessories that can be attached to the ends of the measuring device thereby extending its length. There may also be an accessory that extends beyond the upper surface of the measuring device, without extending beyond the edges, to provide a barrier to protect the hands and fingers of a user while holding the measuring device in place while cutting. Another accessory may be formed so as to help guide the blade of a rotary cutting device along the edge of the measuring device. While still other accessories may be formed to provide an edge that is not straight such as, but not limited to a wave or saw tooth shaped edge. The accessories in preferred embodiments may be attached to the measuring device in a number of ways including, but not limited to, fabricating a clamping mechanism on the accessories that clamp onto the edges or ends of the measuring device, forming holes through the planar structure and complementary extensions on the accessories that fit tightly in the holes, forming lips or grooves on the edges or ends of the measuring device and complimentary lips or grooves on the accessories that fit together in a tongue and groove configuration, the accessories formed to accommodate suction cups that can be pressed onto and adhere by vacuum pressure to the surface of the measuring device, etc.

In one exemplary embodiment the measuring device is formed with holes formed through the planar structure near its ends. For example, without limitation, there may be two such holes near the corners on each end of the planar structure so that the holes can be used to attach accessories to either edge for right-handed or left-handed users or to attach accessories to the ends of the measuring device to extend its length. The holes may be any shape such as, but not limited to, circles, triangles, squares, rectangles or polygons. In one exemplary embodiment the holes are ovals. The accessories may be formed to include a portion where the accessories may be attached to the planar structure. The attaching portion may further comprise extensions that protrude from the lower surface of the accessory, and the extensions are the same size and shape as the holes formed through the planar structure of the measuring device. In one exemplary embodiment, the attaching portion of the accessory may comprise round holes formed through the portion with the extension and a locking mechanism that includes a cylinder with one end that is flanged to form an oval shape that matches the length and width dimensions and shape of oval holes in the measuring device. The round end of the cylinder is inserted up through the round hole formed through the attaching portion and extension of the accessory with the oval flanged bottom portion of the cylinder stopping against the lower surface of the extension. A lever may be attached to the top of the cylinder above the upper surface of the attaching portion of the accessory so that the user can rotate the cylinder. The user can then align the flanged bottom portion of the cylinder with the lower oval surface of the extension and insert both into the hole in the planar structure of the measuring device. The upper surface of the flanged oval end of the cylinder is level with the lower surface of the planar structure so that the cylinder may be rotated and its oval, non-circular shape is no longer in alignment with the hole in the planar structure therefore locking the cylinder underneath the planar structure until rotated back to the original position.

In one exemplary embodiment, examples of accessories that may be attached to the edges of the measuring device, thereby extending its width, may be formed to include a straight outside edge that is parallel to and level with the edge of the planar structure to which they are attached. A user may guide the blade of a rotary cutting device along the straight outside edge of the attachment thereby adding the distance between the edge of the planar structure and straight outside edge of the attachment to the width of material measured and cut. For example, without limitation, three such versions of width extending accessories may be formed wherein one version adds one-half inch (½"), another version adds seven-eighths inch (⅞") and the third version adds one and one-quarter inch (1¼") to the width of material lined up to a measurement line on the lower surface of the planar structure to which they are attached. These are some of the most common measurements for seam allowance that one skilled in the art of quilting may add to the width of the material they are cutting for the unfinished sizes of squares and half and quarter square triangles, one-half inch (½") for squares, seven-eighths inch, (⅞") for half-square triangles and one and one-quarter inches (1¼") for quarter square triangles. When quilting, it is common to sew various combinations of these three shapes together to form larger pieces know as quilt blocks. In many of the most commonly made quilt blocks, the squares and half and quarter square triangles used to make the blocks are all the same finished size yet differ in their unfinished sizes. These three accessories add these different amounts to the width of the planar structure along the edge a user uses as a guide for their cutting device. Therefore a user could attach the appropriate width-extending accessory and line the edge of the material up to the measurement line on the measuring device that represents the finished size of the squares and half and quarter square triangles respectively which, in many cases, would be the same for all three. By running the blade of the rotary cutting device along the outer edge of the appropriate width-extending accessory the user could cut the material to the correct width for the unfinished size of each piece, without changing where they line the edge of the material up to the measurement line underneath the measuring device. This becomes an even bigger advantage when used in combination with the movable material alignment guide in preferred embodiments. Using a movable material alignment guide in preferred embodiments, a user can align the guide with the measurement line for the finished size of each piece needed to make the block and, without changing the guide's alignment, simply attach the appropriate width-extending accessory for the pieces they are making. Other embodiments may include width-extending accessories that add other amounts of seam allowance such as, but not limited to, three-quarters of an inch (¾") that are used to make the unfinished sizes of pieces like equilateral triangles. There may also be a width-extending accessory that has multiple slots with each slot being at a predetermined distance from the edge of the measuring device to which it is attached to guide the cutting blade. For example, without limitation, a user could insert a cutter into a slot that is one-half inch (½") from the edge to add a seam allowance for squares and rectangles and there may also be separate slots, such as, but not limited to, slots that are seven-eighths inch (⅞") and one and one-quarter inch (1¼") from the cutting edge of the measuring device on the same width-extending accessory to add different amounts of seam allowance.

Exemplary embodiments may also include accessories that can be attached to the edge of the measuring device, thereby extending the width of the measuring device by amounts larger than those commonly added for seam allowance therefore adding to the dimensions of material pieces the user can measure and cut. In one exemplary embodiment the measuring device is twelve inches (12") long and six inches (6") wide, and the accessory is twelve inches (12") long and four inches (4") wide. In this embodiment, the accessory extends the width of the pieces of material the user can measure and cut from a maximum of six inches (6") to a maximum of ten inches (10"). The accessory may be formed so as to be able to attach additional accessories to the outside edge so that, for example, without limitation, the accessories that add various amounts of seam allowance can be attached so that seam allowances can be automatically added for pieces wider than six inches (6"). The user may also add additional accessories that add to the width to cut even wider pieces than the measurements previously given. Those skilled in the art, in light of the present teachings, will readily recognize that accessories of various different sizes may be available for alternate embodiments.

There may also be a width-extending accessory wherein the outer edge of the accessory is movable to create different amounts of distance between the edge of the accessory and the edge of the planar structure of the measuring device. In one exemplary embodiment when attached to the planar structure of the measuring device the movable outside edge of the adjustable width-extending accessory is parallel to and level with the edge of the planar structure to which the accessory is attached. The accessory may be connected at the ends of the adjustable width-extending accessory by a tongue and groove configuration that enables the accessory to slide in and out while remaining level and parallel as it moves. The outside edge of the adjustable width extending accessory may add any amount of distance from where it is slid in to the closest distance to the edge of the planar structure and where it is slid out to the furthest distance away and any distance in between. One exemplary embodiment may include a locking mechanism that enables a user to add specific amounts of distance such as, but not limited to, widths added for common amounts of seam allowance. The locking mechanism may include pins or tabs that are inserted into various holes or slots formed on the ends of the adjustable width-extending accessory wherein the pins or tabs are inserted into the holes or slots when the outer edge is moved to a desired position. It will be appreciated by those skilled in the art that the outer edge of the adjustable width-extending accessory may be made adjustable by other means such as, but not limited to, turning a dial connected to a geared or rack and pinion type mechanism.

Exemplary embodiments may also include accessories that are attached to the ends of the measuring device, thereby extending its length, adding to the lengths of material that the user can measure and cut. Most quilters purchase various lengths of material that is folded once in half and wrapped around a bolt that is about twenty-four inches (24") long. The material itself is around forty-four (44") to forty-five inches (45") wide when unfolded. Quilters commonly start by folding the material in half so it is about twenty-two inches (22") wide and then lay the measuring device over the edge of the material to cut long strips of a desired width. Quilters then rotate the long strips ninety degrees (90°) and cut the strips into smaller pieces. It is therefore useful to have a measuring device that is practical for cutting both long and short lengths of material. Exemplary embodiments of the present invention provide accessories that may be attached to one or both ends of the measuring device thereby extending the lengths of material that can be measured and cut. The length-extending accessories may then be removed to provide a measuring device that is less unwieldy when cutting the strips into smaller pieces.

In one exemplary embodiment the measuring device is twelve inches (12") long and six inches (6") wide, and the accessories are six inches (6") long and six inches (6") wide. The user may attach one of the accessories to one end of the measuring device thereby extending its length to eighteen inches (18"). The user could also attach two of the accessories, one to each end of the measuring device, thereby extending the length of the measuring device to twenty-four inches (24"). The user may also add additional accessories that add to the length of the measuring device to extend its length beyond twenty-four inches (24"). The accessories that add to the length of the measuring device may also include through holes on their edges so that longer versions of the accessories that add to the width of the measuring device can be attached to the various combinations of the measuring device and attached accessories. For some embodiments, there may also be accessories that can connect two or more measuring devices together end-to-end or side-by-side therefore extending the widths or lengths of material that a user can measure, and/or cut. There may also be accessories formed with edges that are other than straight, such as, but not limited to, curving or angling in and out to provide a cutting edge that results in a decoratively shaped edge of the material.

Another attachable accessory in an exemplary embodiment may be formed to provide a barrier near the edge of the measuring device against which the user cuts. In one exemplary embodiment the barrier accessory is approximately one-eighth inch (⅛") thick and attaches to the edge of the measuring device so that the accessory extends beyond the upper surface of the measuring device by one-half inch (½") to two inches. In this embodiment, the accessory is located between one-half inch (½") to one inch (1") in from the edge of the measuring device so as not to interfere with the cutter. The various accessories that add to the width of the measuring device may also include similar barriers that are formed as vertical extensions from their surfaces.

Still another exemplary attachable accessory may be formed to extend beyond the edge of the measuring device along which the user guides the blade of the rotary cutting device and may be formed so as to provide a narrow slot between that edge of the measuring device and the accessory. The accessory attaches to the ends of the measuring device and extends from one-quarter of an inch (¼") to one inch (1") beyond the edge of the measuring device. The accessory leaves a narrow space between the inside edge near the measuring device and the cutting edge of the planar structure of the measuring device. This narrow space, or slot, is from 20 to 40 thousandths of an inch wide and extends the length of the cutting edge of the planar structure to the points at each end necessary to connect the accessory to the measuring device. Accessories providing cutting slots may comprise slots of various different sizes in alternate embodiments. Furthermore in one exemplary embodiment, near the ends of the measuring device where the accessory is connected to the measuring device the space between the slot may be formed so as to be substantially wider than 20 to 40 thousandths of an inch so as to make it easy to get the blade of the rotary cutting device started into the narrower portion of the slot. This wider starting point may be approximately one-quarter inch (¼") wide nearest the end of the planar structure with the width of the slot decreasing as the distance from the end of the planar structure increased. In typical use of this embodiment of the blade-guiding accessory, a user inserts the blade of a rotary cutting device into the wider portion of the slot near one of the ends of the planar structure and as the user moves the cutting device in the direction of the opposite end of the planar structure the cutting device is guided into the narrow portion of the slot and therefore is guided at the correct position and angle to provide an accurate cut.

Referring now to the drawings wherein the showings are for purposes of illustrating preferred embodiments of the present invention only, and not for purposes of limiting the same. FIG. 1 illustrates an exemplary measuring device 10 with a movable material alignment guide 15, in accordance with an embodiment of the present invention. In the present embodiment, measuring device 10 is preferably formed of transparent material such as, but not limited to, plastic or acrylic; however, in alternate embodiments measuring devices and their components may be made of various other transparent materials or opaque materials such as, but not limited to, opaque plastics, wood, rubber, etc. Measuring device 10 comprises a planar structure 13. In the present embodiment, planar structure 13 is substantially rectangular with either rounded or sharp corners. In light of the present teachings, it will be appreciated by those skilled in the art that planar structures in alternate embodiments may be in shapes other than a rectangle such as, but not limited to, triangles, squares, circles, or polygons, without exceeding the scope or spirit of the present invention. In the present embodiment, planar structure 13 has an upper surface and a lower surface, two edges 105 and 105*a* and two ends. The lower surface of planar structure 13 comprises plural measurement lines 12 and measuring markers 123. In the present embodiment, measuring markers 123 are numbers that are used to indicate the number of inches that measurement lines 12 are from edges 105 and 105*a* of measuring device 10. However, the measuring markers in alternate embodiments may indicate various other measurements such as, but not limited to, fractions of inches, and yet other alternate embodiments may be implemented to indicate metric measurements. The present embodiment also comprises various other markings, including angled lines 124 indicating 30, 45 and 60 degrees; however, alternate embodiments may not include these additional markings. Planar structure 13 further comprises holes 11 extending thorough planar structure 13. The exemplary embodiment shown in the illustration includes four holes 11, one near each corner of planar structure 13; however, alternate embodiments may comprise various different numbers of holes, for example without limitation, two holes with one near each corner of the right-hand side of the measuring device. The present embodiment further comprises movable material alignment guide 15 attached along the ends of planar structure 13 so that movable material alignment guide 15 extends substantially from end to end along the lower surface of planar structure 13. In the present embodiment shown by way of example in FIGS. 1-7, movable material alignment guide 15 is snap fitted to the ends of planar structure 13 so that movable material alignment guide 15 can be removed and reattached in various alignments under planar structure 13. Those skilled in the art, in light of the present teachings, will readily recognize that there are a multiplicity of suitable means for attaching the movable material alignment guide to the planar structure of the measuring device in alternate embodiments such as, but not limited to, frictionally attaching the movable material alignment guide, attaching the movable material alignment guide into holes formed in the planar structure, forming extensions from the upper surface of the movable material alignment guide that can be press fitted into holes formed through the planer structure, etc. Furthermore, the movable material alignment guide in alternate embodiments may not extend from end to end of the planar structure of the measuring device.

In the present embodiment, movable material alignment guide 15 is attached to the lower surface of planar structure 13 so that a front edge 16 of movable material alignment guide 15 is aligned with a four and one-quarter inch (4¼") measurement line 14 on the lower surface of planar structure 13 when used by a right-handed user. Movable material alignment guide 15 can be rotated one hundred and eighty degrees so that front edge 16 faces opposite edge 105a of measuring device 10 for use by a left-handed user. In the present embodiment, measuring markers 123 are configured so that measuring device 10 may be used by a left-handed or a right-handed user. However, alternate embodiments may be implemented as being left-handed or right-handed only.

In typical use of the present embodiment, a user can align a straight edge of material up to front edge 16 of movable material alignment guide 15 and then cut along edge 105 of planar structure 13. The resulting width of the piece of material that is cut is the distance from front edge 16 of movable material alignment guide 15 to edge 105 of planar structure 13 and therefore the width indicated by measuring markers 123 and corresponding measurement lines 12 with which front edge 16 of movable material alignment guide 15 is aligned, which is four and one-quarter inches (4¼") in the present example. This enables the user to easily, accurately and consistently cut material to specific widths.

FIGS. 2 through 7 illustrate an exemplary movable material alignment guide 15, in accordance with an embodiment of the present invention. FIG. 2 is a top view of movable material alignment guide 15. FIG. 3 is a detailed view of a top end of movable material alignment guide 15. FIG. 4 is a cross sectional view of movable material alignment guide 15. FIG. 5 is a side view of the top end of movable material alignment guide 15. FIG. 6 is a side view of a bottom end of movable material alignment guide 15, and FIG. 7 is a cross sectional view of movable material alignment guide 15 attached to a measuring device 10. In the present embodiment, movable material alignment guide 15 comprises an elongate strip 21 that may include recesses or notches 17 formed along a front edge 16. Notches 17 aid a user in aligning a piece of material with front edge 16 of elongate strip 21 by enabling the user to see if the material has slid under front edge 16 at various points along elongate strip 21. Referring to FIG. 5, an upward extension 22 at the top end of elongate strip 21 extends upward and then slightly back inward at the top to form a hook 19. Referring to FIG. 6, an upward extension 24 at the bottom end of elongate strip 21 extends upward and then back inward at the top to form a hook 23. The heights of upward extensions 22 and 24 of elongate strip 21 approximately match the thickness of a planar structure 13 of measuring device 10, shown by way of example in FIG. 7. Movable material alignment guide 15 is preferably made of a flexible material such as, but not limited to, plastic so that elongate strip 21 may be bent and the ends of movable material alignment guide 15 can be snap fitted to the ends of planar structure 13 with hook 19 and hook 23 slightly overlapping the upper surface of planar structure 13 thereby keeping the upper surface of elongate strip 21 in place against the lower surface of planar structure 13. Movable material alignment guide 15 can be removed and repositioned by applying downward pressure to the tops of upward extensions 22 and 24. Referring to FIGS. 5 and 6, hook 23 is substantially longer than hook 19 at the opposite end. This enables a user to slide the end with longer hook 23 onto one end of planar structure 13 so that longer hook 23 holds the bottom end of movable material alignment guide 15 in place while the user aligns the top end with the same measurement line on the opposite end of measuring device 10 rather than trying to align the entire length of movable material alignment guide 15 at once. The unattached end of movable material alignment guide 15 can then be snapped into place on that edge of measuring device 10. In the present embodiment hook 23 at the bottom end of movable material alignment guide 15 is larger than hook 19 at the top end. However, in alternate embodiments the hook at the top end may be larger than the hook at the bottom end, and in yet other alternate embodiments, the hooks may be equal in size.

In the present embodiment, movable material alignment guide 15 further comprises raised extensions 18 that protrude from at least one portion of the upper surface of elongate strip 21. Extensions 18 are located near the ends of elongate strip 21 in the present embodiment, however, extensions may be located in various other positions in alternate embodiments, for example, without limitation, at the center of the elongate strip or along the entire length of the elongate strip. The exemplary embodiment shown comprises multiple small raised extension 18 leaving space or gaps 20 in between raised extensions 18. As shown in FIG. 7, measurement lines 12 on measuring device 10 are formed as raised ribs that protrude from the lower surface of planar structure 13 of measuring device 10. Raised extensions 18 and gaps 20 are positioned on elongate strip 21 so that raised rib measurement lines 12 can be engaged into gaps 20 and raised extensions 18 can be engaged into the spaces between raised rib measurement lines 12 when movable material alignment guide 15 is attached to measuring device 10. Furthermore, raised extensions 18 and gaps 20 are arranged on elongate strip 21 so that when raised extensions 18 and gaps 20 are engaged with raised rib measurement lines 12, front edge 16 of elongate strip 21 is in alignment with at least one of raised rib measurement lines 12 underneath planar structure 13 that are at a specific distance from at least one edge of planar structure 13. In many practical applications, this takes guessing out of aligning the material with a measurement line. In alternate embodiments the movable material alignment guide may comprise a single raised extension to fit between the raised rib measurement lines rather than multiple raised extensions, for example, without limitation, a raised extension that extends from one end to the other in the center of the elongate strip.

Figure 8:
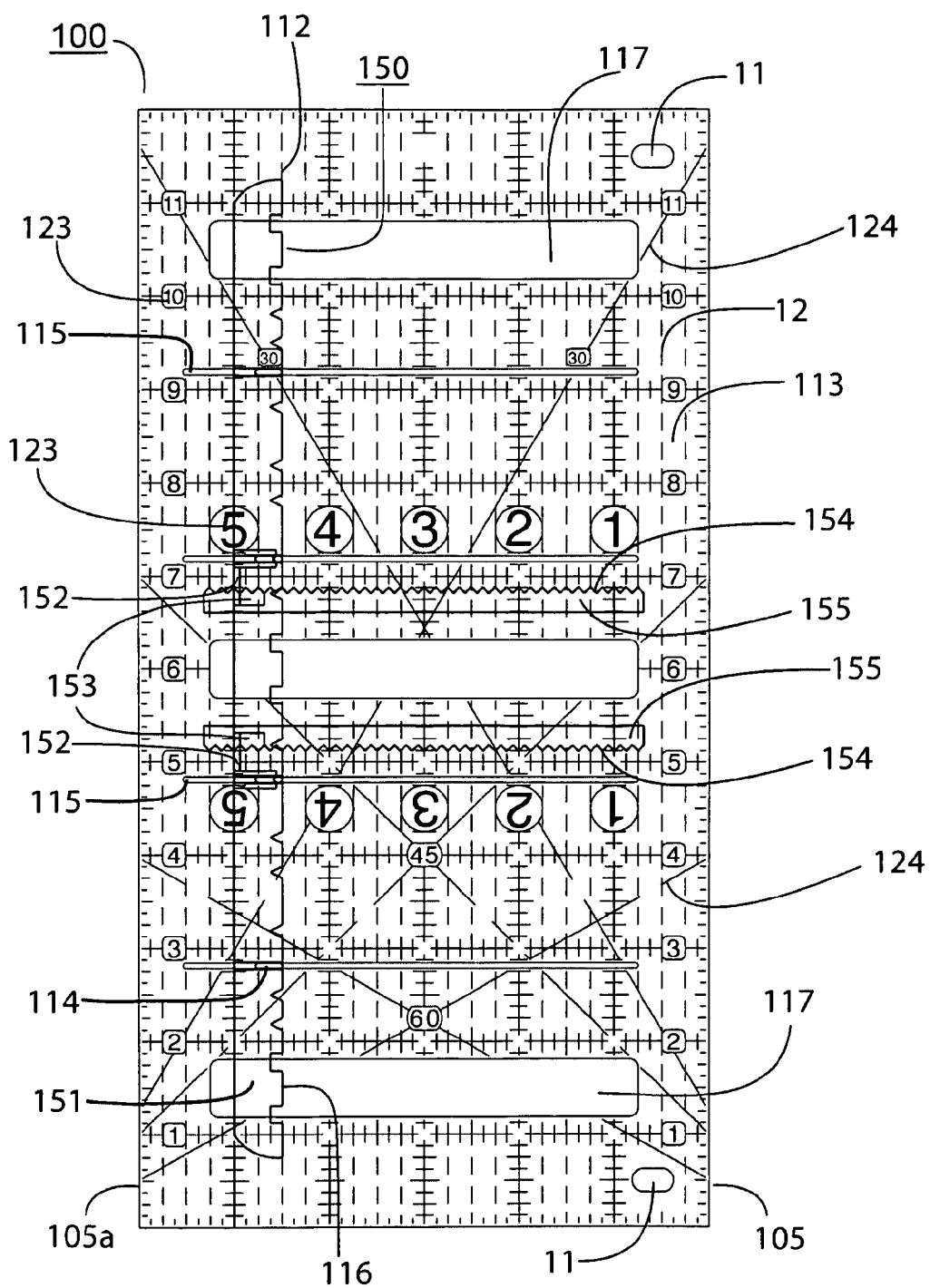
FIG. 8 illustrates an exemplary measuring device with a movable material alignment guide, in accordance with an embodiment of the present invention.

FIG. 8 illustrates an exemplary measuring device 100 with a movable material alignment guide 150, in accordance with an embodiment of the present invention. In the present embodiment, measuring device 100 is similar to measuring device 10 illustrated by way of example in FIG. 1. Measuring device 100 comprises a planar structure 113 preferably made of a transparent material such as, but not limited to, plastic or acrylic; however, alternate embodiments may be made of various other materials such as, but not limited to, opaque plastic, wood, rubber, etc. Measuring device 100 also comprises at least one hole or opening extending through planar structure 113 extending from near one edge 105 of planar structure 113 to another edge 105a. Measuring device 100 comprises a combination of narrow openings 115 and wider openings 117. In alternate embodiments, the measuring device may only include narrow openings or wider openings rather than both, and yet other alternate embodiments may comprise only one opening. In the present embodiment, the elongate edges of openings 115 and 117 are parallel to the ends of planar structure 113. In the present embodiment, measuring device 100 further comprises two holes 11 near the corners of planar structure 113 on the right-hand side and measurement lines 12. Alternate embodiments may comprise various different numbers of holes near the corners, for example, without limitation, four holes with one near each corner or no holes.

In the present embodiment, measuring device 100 further comprises a sliding movable material alignment guide 150 that is similar to movable material alignment guide 15, illustrated by way of example in FIGS. 1 through 7. Movable material alignment guide 150 comprises an elongate strip 151 and further comprises at least one extension or tab 114 that protrudes from the upper surface of elongate strip 151. Tabs 114 can be inserted into narrow openings 115 in planar structure 113. The width of tabs 114 may be slightly less than narrow openings 115 in planar structure 113. This enables tabs 114 to slide back and forth within narrow openings 115 and therefore enables movable material alignment guide 150 to slide back and forth underneath planar structure 113. It will be appreciated to those skilled in the art that, in alternate embodiments, tabs may be implemented to be inserted into wider openings, for example, without limitation, wider openings 117, or that there may be at least two tabs that may be inserted through a wider opening so that the tabs are on opposite elongate sides of the wider opening with the top of the tabs being wider on one side so as to hook over the upper surface of the planar structure enabling the sliding movable material alignment guide to be slid back and forth underneath the planar structure. In another alternate method for attaching the movable material alignment guide to the measuring device, a tab or tabs may be simply pressed into a wider hole and held by friction. In the present embodiment movable material alignment guide 150 further comprises locking mechanisms 152 with teeth 153 to generally prevent movable material alignment guide 150 from moving once it is placed in the desired location on measuring device 100.

Referring to FIG. 8, sliding movable material alignment guide 150 is shown attached to planar structure 113 so that a front edge 116 of elongate strip 151 is aligned with a four and one-half inch (4½") measurement line 112 on the lower surface of planar structure 113. Locking mechanisms 152 can be squeezed together in towards the center of planar structure 113 so that teeth 153 of locking mechanisms 152 disengage from notches 154 in a recessed channel 155 formed into the upper surface of planar structure 113 thereby enabling movable material alignment guide 150 to be moved by sliding underneath planar structure 113 and aligned with a desired measurement line 12 on the lower surface of planar structure 113. The present embodiment also comprises various other features such as, but not limited to, angled lines 124 indicating 30, 45 and 60 degrees and measuring markers 123.

Figure 9:
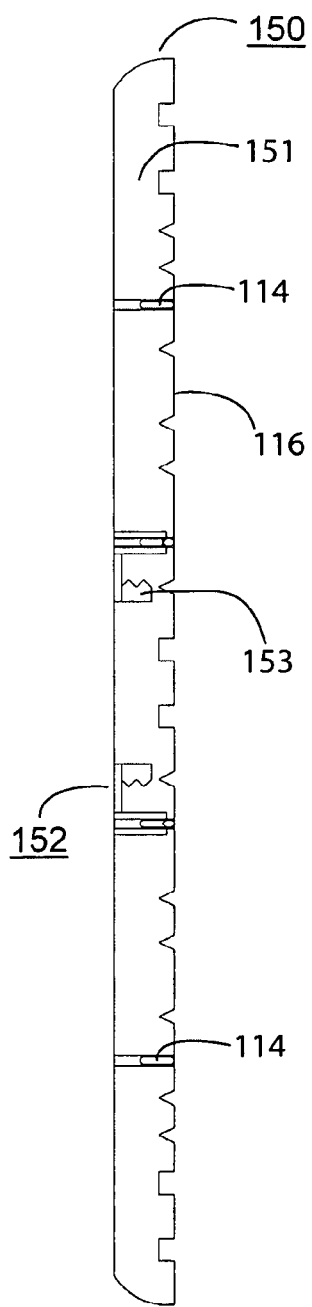
FIG. 9 illustrates a top view of an exemplary movable material alignment guide, in accordance with an embodiment of the present invention. Various components shown in the Figure will separately be illustrated by way of an exemplary close up view in subsequently described FIGS. 10 through 14 with reference continually to FIG. 9.

FIG. 9 illustrates a top view of an exemplary movable material alignment guide 150, in accordance with an embodiment of the present invention. Various components shown in the Figure will separately be illustrated by way of an exemplary close up view in subsequently described FIGS. 10 through 14 with reference continually to FIG. 9. In the present embodiment, movable material alignment guide 150 comprises an elongate strip 151, a front edge 116, tabs 114, and locking mechanisms 152 with teeth 153.

Figure 10:
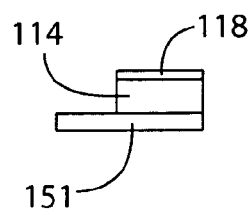
FIGS. 10 through 13 illustrate an exemplary tab of a movable material alignment guide on which a locking mechanism may be attached, in accordance with an embodiment of the present invention.
Figure 11:
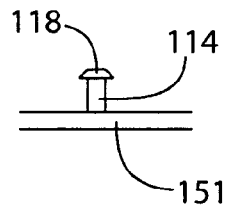
Figure 12:
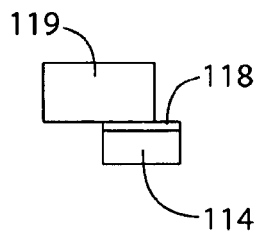
Figure 13:
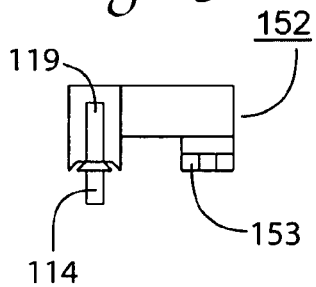

FIGS. 10 through 13 illustrate an exemplary tab 114 of a movable material alignment guide on which a locking mechanism 152 may be attached, in accordance with an embodiment of the present invention. FIG. 10 is a side view of tab 114 attached to an elongate strip 151, FIG. 11 is a front view of tab 114 attached to elongate strip 151, FIG. 12 is a side view of tab 114 with attaching means 119, and FIG. 13 is a front view of tab 114 with a locking mechanism 152 attached. Referring to FIGS. 10 and 11, tab 114 extends perpendicular to the upper surface of elongate strip 151 and is lengthwise perpendicular to a front edge of elongate strip 151. Tab 114 includes a wider portion 118 at its top that can be pressed through an opening in a measuring device, for example, without limitation, opening 115 in measuring device 100, shown by way of example in FIG. 8, thereby generally preventing tab 114 from easily coming back out of the opening. In alternate embodiments tabs may not comprise a wider portion at the top and instead are held in the openings by friction.

Referring to FIGS. 12 and 13, locking mechanism 152 provides a means for the sliding movable material alignment guide to be stopped at predetermined positions underneath a planar structure of a measuring device wherein the front edge of the movable material alignment guide is precisely aligned with one or more of the measurement lines underneath the planar structure that are at a specific distance from one edge of the measuring device. In the present embodiment, tab 114 comprises attachment means 119 on which locking mechanism 152 may be attached. Referring to FIG. 13, locking mechanism 152 is shown attached to attachment means 119 of tab 114. Locking mechanism 152 comprises a portion with teeth 153 for engaging with teeth on a measuring device, as shown by way of example in FIG. 14.

Figure 14:
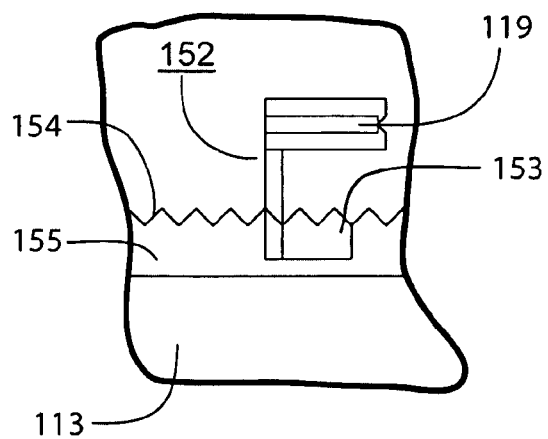
FIG. 14 illustrates an exemplary locking mechanism in use on a measuring device, in accordance with an embodiment of the present invention.

FIG. 14 illustrates an exemplary locking mechanism 152 in use on a measuring device, in accordance with an embodiment of the present invention. In the present embodiment, the upper surface of a planar structure 113 of the measuring device is formed so as to include a recessed channel 155 that has notches 154 formed on at least one elongate edge. In an alternate embodiment, the notches may be formed as extensions on the upper surface of the planar structure, and in another alternate embodiment the notches may be formed in an opening in the planar structure rather than in a recessed channel, for example, without limitation, along the elongate sides of wider opening 117 shown by way of example in FIG. 8. In the present embodiment, when locking mechanism 152 is attached to an attachment portion 119 of a tab of a movable material alignment guide, the portion of locking mechanism 152 with teeth 153 fits into recessed channel 155 so that teeth 153 on locking mechanism 152 engage with notches 154 on recessed channel 155. Teeth 153 may be disengaged from notches 154 by means such as, but not limited to, pushing locking mechanism 152 so it bends to one side so the portion with teeth 153 moves away from notches 154 or raising locking mechanism 152 so that teeth 153 move up and out of recessed channel 155. In an alternate embodiment, the locking mechanism may be implemented with a gear that can be rotated to move the movable material alignment guide along the notches on the measuring device. In the present embodiment, when teeth 153 are disengaged from notches 154 the sliding movable material alignment guide to which locking mechanism 152 is attached can be moved back and forth underneath planar structure 113. When the front edge of the sliding movable material alignment guide is aligned with at least one of the measurement lines on the lower surface of planar surface 113, teeth 153 on locking mechanism 152 are engaged with notches 154 thereby holding the sliding movable material alignment guide in place. Teeth 153 and notches 154 are sized so that the movable material alignment guide may be lined up accurately with the measurement lines. For example, without limitation, in an embodiment with measurement lines every one quarter of an inch (¼"), the teeth and notches are one quarter of an inch (¼") wide. In light of the present teachings, it will be appreciated by those skilled in the art that locking mechanisms in alternate embodiments may work by other means such as, but not limited to having pins that fit into holes formed in the planar structure or by using a circular gear mechanism that fits into teeth formed on the upper surface of the planar structure so that the adjustable guide is moved by rotating the circular gear. Furthermore, in other alternate embodiments, the notches can be formed on the edges of other openings in the planar structure, for example, without limitation, wider opening 117 shown by way of example in FIG. 8, or on the lower surface of the planar structure.

Those skilled in the art, in light of the present teachings, will readily recognize that there is a multiplicity of suitable configurations for measuring devices with movable material alignment guides. For example, without limitation movable material alignment guides may be wider or narrower in alternate embodiments. Different types of locking mechanisms may be used, for example, without limitation, a lever on at least one and of the movable material alignment guide that wraps around the planar structure of the measuring device so that, when rotated, the lever squeezes the planar structure between the lever and the elongate strip of the movable material alignment guide, thereby holding the movable material alignment guide in place. Movable guides that are inserted into holes in the planar structure of the measuring device, similar to movable guides 130 and 140 shown by way of example in FIGS. 49 through 54.

Figure 15:
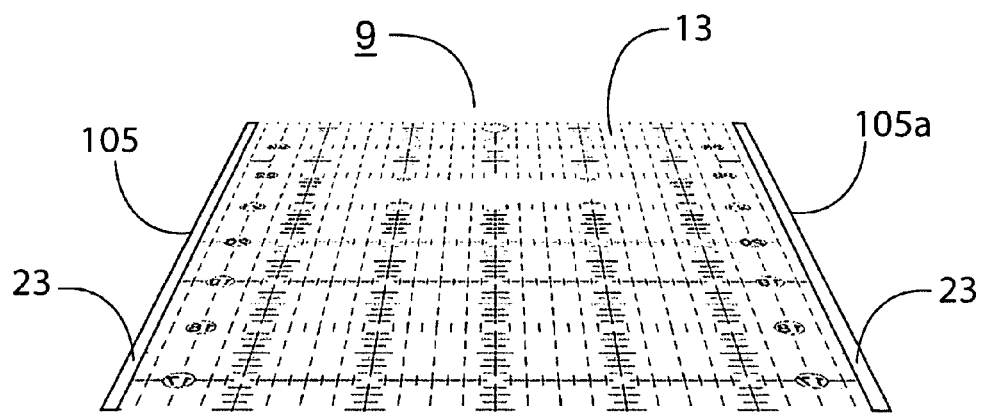
FIGS. 15 and 16 illustrate an exemplary measuring device, in accordance with an embodiment of the present invention.
Figure 16:
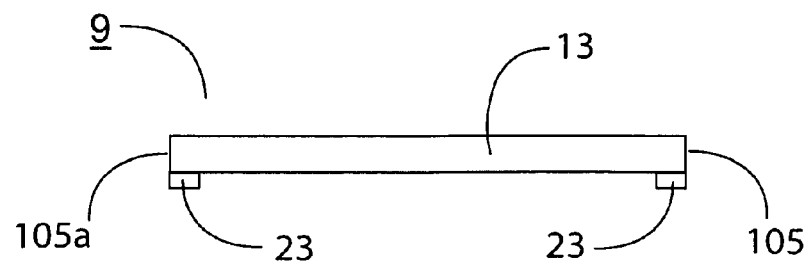

FIGS. 15 and 16 illustrate an exemplary measuring device 9, in accordance with an embodiment of the present invention. FIG. 15 is a bottom perspective view and FIG. 16 is a front view. In the present embodiment, measuring device 9 comprises elongate non-slip strips 23 near each edge, edges 105 and 105a, on the lower surface of a planar structure 13 to increase the gripping force of measuring device 9 to the underlying work surface and material. Elongate non-slip strips 23 may be made of materials such as, but not limited to, vinyl, rubber or synthetic rubber. Elongate non-slip strips 23 may be attached to the lower surface of planar structure 13 by various means such as, but not limited to, adhesive, a secondary molding process, with extensions formed on the upper surface of the elongate non-slip strip that can be frictionally fitted into holes formed through planar structure near the edges, etc. Elongate non-slip strips 23 may be various different sizes, and are preferably from ten to one-hundred-twenty thousandths of an inch thick and from thirty to five-hundred thousandths of an inch wide. In the present embodiment, elongate non-slip strips 23 extend close to or right up to both ends of planar structure 13. However, in alternate embodiments, the non-slip strips may only extend for a portion of the edges of the planar structure, and in yet other alternate embodiments, multiple non-slip strips may be spaced intermittently along the edges of the planar structure. In the present embodiment, when measuring device 9 is used on a flat work surface the lower surfaces of elongate non-slip strips 23 contact the work surface and therefore the lower surface of planar structure 13 are suspended above the work surface. This provides two separate benefits. First it provides a free space underneath planar structure 13 for a movable material alignment guide so that measuring device 9 lays flat and does not rock when the movable material alignment guide is underneath. Secondly, because measuring device 9 is suspended above the work surface, force applied to the upper surface of planar structure 13 is transferred to the lower surfaces of elongate non-slip strips 23 that are in contact with the work surface. This concentrates the downward force applied to the upper surface of planar structure 13 into a smaller surface area along edge 105 of planar structure 13, where a right-handed user would guide a cutter when cutting material, and edge 105a, where the lower surface of elongate non-slip strip 23 is typically in unobstructed contact with the work surface. A quilter commonly uses a cutting mat on the work surface, and, in this case, one of the elongate non-slip strips 23 grips the surface of the cutting mat so the user could easily hold measuring device 9 in place while cutting. Those skilled in the art, in light of the present teachings, will readily recognize that measuring device 9 may comprise a multiplicity of additional features such as, but not limited to, various types of movable material alignment guides, locking mechanisms, measurement lines, openings, etc.

FIGS. 17 through 19 illustrate an exemplary width-extending accessory 40 for a measuring device, in accordance with an embodiment of the present invention. FIG. 17 is a top view, FIG. 18 is a side view, and FIG. 19 is a front view of width-extending accessory 40 attached to an edge 105 of a planar structure 13 of a measuring device 8. In the present embodiment, width-extending accessory 40 comprises a planar structure 41 with an outside edge 42 that is the same thickness and is parallel to and level with edge 105 of planar structure 13 when width-extending accessory 40 is attached to planar structure 13. In alternate embodiments the width-extending accessory may vary in thickness from the planar structure to which it is attached. For example, without limitation, in some embodiments where the measuring device comprise non-slip extensions, for example, without limitation, measuring device 9 shown by way of example in FIGS. 15 and 16, the width-extending accessory may be the thickness of the planar structure and the non-slip extension together so that the width-extending accessory is able to rest on the work surface and be level with the upper surface of the planar structure. In typical use of the present invention, a user can guide the blade of a rotary cutting device along outside edge 42 of planar structure 41 when width-extending accessory 40 is attached to planar structure 13.

In the present embodiment, width extending accessory 40 further comprises a raised portion 44 that extends back from an inside edge 43 of planar structure 41. Raised portion 44 forms a planar structure whose lower surface is level with and parallel to the upper surface of planar structure 41. Width-extending accessory 40 further comprises a vertical extension 34 from the upper surface of planar structure 41 from which there is at least one extension 31 that extends back in the same direction as raised portion 44. Extensions 31 are formed with holes 32 into which suction cups 33 may be inserted at a height and angle that enable suction cups 33 to be compressed onto the surface of planar structure 13 of measuring device 8 so that the lower surface of raised portion 44 is in level contact with the upper surface of planar structure 13 of measuring device 8 and planar structure 41 is level with and parallel to planar structure 13.

In the present embodiment, planar structure 41 comprises four raised extensions 44, and vertical extension 34 comprises three extensions 31 that extend back. However alternate embodiments may comprise various different numbers of extensions. In the present embodiment, extensions 31 comprise holes 32 formed through the surfaces of extensions 31 into which suction cups 33 are snap fitted. It will be appreciated by those skilled in the art that the suction cups may be attached by other means such as, but not limited to, gluing, sonic welding, using a keyhole design or using suction cups with pilot holes formed in their tops into which various screws or tacks can be inserted. Referring to FIG. 19, in typical use of the present embodiment, a user aligns inside edge 43 of planar structure 41 with elongate edge 105 of planar structure 13 of measuring device 8. The user then presses suction cups 33 onto the upper surface of planar structure 13. Referring to FIG. 18, vertical extension 34 forms a vertical planar structure to provide a built-in barrier between the fingers with which a user is holding measuring device 8 and the rotary cutter the user runs along outside edge 42 of planar structure 41 of width extending accessory 40. Width-extending accessories according to the present embodiment can be attached to and used with most conventional measuring devices used by quilters as well as measuring devices with movable material alignment guides according to embodiments of the present invention.

FIGS. 20 and 21 illustrate an exemplary width-extending accessory 40 for a measuring device, in accordance with an embodiment of the present invention. FIG. 20 is a top view, and FIG. 21 is a front view. Various components shown in the Figures will separately be illustrated by way of an exemplary close up view in subsequently described FIGS. 22 through 26 with reference continually to FIGS. 20 and 21. FIG. 22 is a partial side view. In the present embodiment, width-extending accessory 40 comprises a planar structure 41, an outside edge 42, an inside edge 43 and two raised portions 44. Each raised portion 44 of width-extending accessory 40 comprises a hole 45 formed through it. Each raised portion 44 also comprises a small extension or bump 46 that protrudes from the upper surface and an extended bottom portion 47 that protrudes from the lower surface.

FIG. 22 is a side view of an exemplary raised portion 44 of a width-extending accessory, in accordance with an embodiment of the present invention. In the present embodiment, an extended bottom portion 47 is preferably formed so as to have the same dimensions and shape as holes formed through the planar structure of the measuring device on which width-extending accessory 40 is to fit, for example, without limitation, holes 11 shown by way of example in FIGS. 1 and 8. This enables width-extending accessory 40 to be attached to the measuring device by inserting extended bottom portions 47 into the holes of the measuring device. In the present embodiment, extended bottom portions 47 may be held in the holes in the measuring device by friction, or a locking mechanism, as shown by way of example in FIGS. 23 through 26. In the present embodiment an extension 46 acts as a stopper for the locking mechanism, and alternate embodiments may be implemented without a stopper extension.

FIGS. 23 through 26 illustrate an exemplary locking mechanism 50 for a width-extending accessory 40 of a measuring device, in accordance with an embodiment of the present invention. FIG. 23 is a front cross-sectional view. FIG. 24 is a top view of locking mechanism 50 attached to raised portion 44 of width-extending accessory 40. FIG. 25 is a front view of locking mechanism 50, width-extending accessory 40 and a measuring device 8 in an unlocked position, and FIG. 26 is a front view of locking mechanism 50, width-extending accessory 40 and measuring device 8 in a locked position. In the present embodiment, locking mechanism 50 comprises a cylinder 53 with a flanged bottom 54. Attached to the top of cylinder 53 is a lever 51. Lever 51 may be attached to cylinder 53 by various means including, without limitation, adhesive, sonic welding, snap fitting, etc. Referring to FIGS. 24, 25 and 26, locking mechanism 50 may be attached to width-extending accessory 40 by inserting cylinder 53 up through hole 45 from the bottom of raised portion 44 until flanged bottom 54 is against the lower surface of an extended bottom portion of width-extending accessory 40, for example, without limitation, extended bottom portion 47 shown by way of example in FIGS. 21 and 22, which has been inserted in a hole in measuring device 8. Lever 51 may then be attached to cylinder 53 holding locking mechanism 50 onto width-extending accessory 40 while allowing cylinder 53 to rotate within hole 45. Flanged bottom 54 of cylinder 53 preferably has the same shape and width and length dimensions as the hole formed through a planar structure 13 of measuring device 8, and therefore has the same length and width dimensions as the lower surface of the extended bottom portion of width-extending accessory 40. The width and length dimensions of the flanged bottom can form almost any geometric pattern other than a circle for example, without limitation, an oval, square, rectangle, octagon, other polygons, etc. In the present embodiment, flanged bottom 54 along with the lower surface of the extended bottom portion of width-extending accessory 40 and the outline of the hole in measuring device 8 are all an oval shape wherein their width is less than their length.

Referring to FIGS. 25 and 26, lever 51 can be rotated so that flanged bottom 54 of cylinder 53 is in alignment with the lower surface of the extended bottom portion of width-extending accessory 40. A user can then lower flanged bottom 54 and the extended bottom portion of width-extending accessory 40 down into the hole in measuring device 8 until the lower surface of raised portion 44 is flush against the upper surface of planar structure 13. The lower surface of the extended bottom portion is level with the lower surface of planar structure 13; therefore the upper surface of flanged bottom 54 of cylinder 53 is also level with the lower surface of planar structure 13. The user can then rotate lever 51 until flanged bottom 54 is out of alignment with the hole in planar structure 13 so that part of the upper surface of flanged bottom 54 is under and against the lower surface of planar structure 13 thereby locking width extending accessory 40 in place along one edge of measuring device 8, as shown by way of example in FIG. 26. In the present embodiment, lever 51 can be rotated ninety degrees between where lever 51 contacts a flat edge of raised portion 44 in the locked position, as illustrated by way of example in FIGS. 24 and 26, and where lever 51 contacts an extension 46 when rotated ninety degrees the other way to stop lever 51 when locking mechanism 50 is in alignment to be inserted and attached to planar structure 13, as shown by way of example in FIG. 25. Alternate embodiments may comprise various other means for stopping the lever such as, but not limited to, two stopper extensions, a dimple on the lever into which an extension on the raised portion fits, etc. Other alternate embodiments may be implemented without a lever. In these embodiments, the user may lock and unlock the locking mechanism by twisting the flanged bottom of the cylinder into and out of alignment with the hole into which the locking mechanism is inserted. Those skilled in the art, in light of the present teachings, will readily recognize that in alternate embodiments there may be a combination of locking mechanisms, suction cups and extensions used to align and attach a width-extending accessory to the edge of a measuring device. For example, without limitation, a width-extending accessory may comprise locking devices on each end with one or more suction cups in between. Another exemplary embodiment may comprise a combination of suctions cups used to attach the width-extending accessory and extensions that would fit into holes formed in the planar structure of a measuring device for alignment with no locking mechanism. An alternative embodiment suitable for many practical applications comprises suction cups as a means of attachment with no extensions for alignment wherein the user would abut the inside edge of planar structure 41 against an edge of the measuring device to align the width-extending accessory with the measuring device.

In typical use of the present embodiment, a user can attach width-extending accessory 40 to one edge of planar structure 13 and align a straight edge of a piece of material with a measurement line underneath planar structure 13 that is a specific distance from one edge of planar structure 13. By cutting along the outside edge of width extending accessory 40, the user automatically adds the distance from the outside edge of width extending accessory 40 to the edge of planar structure 13 to the width of the piece of material the user is cutting. In the present embodiment, the distance between the outside edge of the planar structure of width-extending accessory 40 and the edge of planar structure 13 to which width-extending accessory 40 is attached is one-half inch (½"), which is the amount quilters add to the finished sizes of pieces they cut to form squares, rectangles and many diamond shapes. This measurement is one of the three most common measurements used by quilters when adding seam allowances to a piece of material. Those skilled in the art, in light of the present teachings, will readily recognize that the distance added by width-extending accessories may vary in alternate embodiments. For example, without limitation, the embodiments illustrated by way of example in FIGS. 27 and 28 add two more common measurements for seam allowances, and the embodiment illustrated in FIG. 29 add more width than a common seam allowance.

FIGS. 27 through 29 illustrate exemplary width-extending accessories 60, 70 and 80 in varying sizes, in accordance with embodiments of the present invention. FIG. 27 illustrates a narrow width-extending accessory 60, FIG. 28 illustrates a slightly wider width-extending accessory 70, and FIG. 29 illustrates an even wider width-extending accessory 80. Width-extending accessories 60, 70, and 80 are formed with raised portions 44 with extended bottom portions to be inserted into holes in measuring devices and holes 45 into which a locking mechanism, such as, but not limited to, locking mechanism 50 illustrated by way of example in FIGS. 23 through 26. Those skilled in the art, in light of the present teachings, will readily recognize that there is a multiplicity of suitable means for attaching width-extending accessories to measuring devices in alternate embodiments such as, but not limited to, suction cups, clamps, etc. In the present embodiment, width-extending accessories 60, 70, and 80 include various amounts of distance between outside edges 42 and inner edges 43, which abut the edge of the planar structure to which the width-extending accessories are attached. In the present embodiments, the distances that width-extending accessories 60 and 70 add are two of the three most common distances that those skilled in the art of quilting add to the finished sizes of the pieces of material they measure and cut to accommodate for the amount of material taken up in the seam allowance. Referring to FIG. 27, The distance between outside edge 42 of a planar structure extension 61 and inner edge 43 on width-extending accessory 60 is seven-eighths of an inch (⅞"), which is the amount quilters add to the finished sizes of pieces they cut to form half square triangles. Referring to FIG. 28, the distance between outside edge 42 of a planar structure extension 71 and inner edge 43 on width-extending accessory 70 is one and one-quarter inch (1¼"), which is the amount quilters add to the finished sizes of pieces they cut to form quarter square triangles. In light of the present teachings, it will be readily appreciated by those skilled in the art that embodiments of the present invention may be implemented to add other amounts of seam allowance such as, but not limited to, three-quarters inch (¾") and five-eighths inch (⅝"), which are typically used for equilateral triangles and triangle in a square units respectively. Some embodiments may also be formed to add smaller subdivisions of an inch such as, but not limited to, increments of one-sixteenth inch (1/16"). Width-extending accessories according to embodiments of the present invention may also be formed to add increments based on the metric system.

Embodiments of the present invention may further comprise width-extending accessories that add to the widths of pieces the user can cut in larger amounts than that of common seam allowance widths. Referring to FIG. 29, width-extending accessory 80 is wider than the previously described width-extending accessories 40, 60, and 70. In the present embodiment, the distance between an outside edge 42 of a planar structure extension 81 and an inner edge 43 is four inches. A user can attach the four-inch wide width-extending accessory 80 to a planar structure of a measuring device thereby increasing the widths of material that they can measure and cut by four inches. The four-inch wide width-extending accessory 80 comprises two holes 11 formed through planar structure extension 81 so that additional width extending accessories can be attached to outer edge 42 thereby increasing the widths of material a user can measure and cut even further. For example, without limitation, a user may add width-extending accessories that are formed to add common amounts of seam allowance such as, but not limited to, width-extending accessories 40, 60, and 70 previously described. This would allow for the automatic inclusion of the seam allowance for widths wider than a user could measure and cut with a narrower measuring device alone. Also, a user may add other types of accessories to width-extending accessory such as, but not limited to, another wide width-extending accessory in order to measure and cut very wide pieces of material, for example, without limitation, pieces of material that are twelve inches (12") wide, a blade-guiding accessory, for example, without limitation blade-guiding accessories 160 and 110 illustrated by way of example in FIGS. 46 through 48, a barrier device, for example, without limitation, barrier device 90 illustrated by way of example in FIGS. 44 and 45, etc. In the present embodiment, width-extending accessory 80 comprises a hole 11 on each end near outside edge 42 of planar structure extension 81 and three windows 82. However, alternate embodiments may comprise various different numbers of holes and windows, and some embodiments may comprise no holes or windows.

Figure 32:
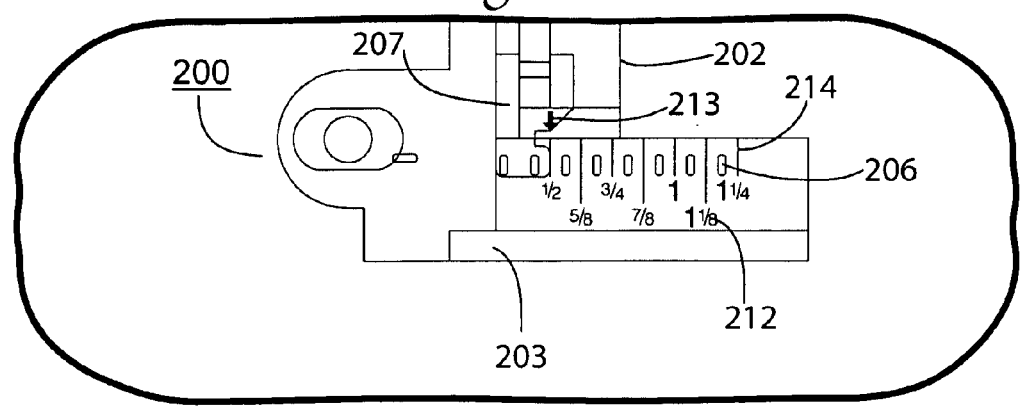

FIGS. 30 through 32 illustrate an exemplary adjustable width-extending accessory 200 for use with a measuring device, in accordance with an embodiment of the present invention. FIGS. 30 and 31 are top views with adjustable width-extending accessory 200 in an extended and retracted position, respectively, and FIG. 32 is a close-up view of an end 203 of adjustable width-extending accessory 200. In the present embodiment, adjustable width-extending accessory 200 comprises a movable planar structure 201 with an outside edge and a vertical extension 209. Vertical extension 209 may act as a barrier between the user's hand and the cutting tool. Alternate embodiments may not include a vertical extension. Outside edge 202 of movable planar structure 201 of adjustable width-extending accessory 200 can be moved to variable distances from the edge of a planar structure to which it is attached. Referring, to FIG. 32, movable planar structure 201 comprises ends that include a locking mechanism 207 with at least one pin or tab that engage into holes or slots 206 formed through ends 203 of raised portions 44. Raised portions 44 further comprise holes 45 into which a locking mechanism may be inserted to attach adjustable width-extending accessory 200 to the planar structure of a measuring device. In alternate embodiments, an adjustable width-extending accessory may be attached to a measuring device using various other means such as, but not limited to, suction cups, clamps, etc. In the present embodiment, movable planar structure 201 may be moved by disengaging at least one tab 208 from at least one hole or slot 206 and repositioning movable planar structure 201 so that outside edge 202 is at a desired specific distance from the edge of the planar structure to which adjustable width-extending accessory 200 is attached and then engaging tab 208 with a slot 206 that is aligned for the desired distance. In the present embodiment, movable planar structure 201 can slide towards and away from the edge of the planar structure to which it is attached. Those skilled in the art, in light of the present teachings, will readily recognize that a multiplicity of suitable means exist for making the adjustable width-extending accessory adjustable, such as, but not limited to, forming the ends of the movable planer structure 201 to include pins or teeth that can be press fitted into corresponding holes or notches formed in the ends 203 of adjustable width extending accessory 200, a gear system, rack and pinion mechanism, etc.

The present embodiment also comprises measuring markers 212 in arrangement with slots 206 that indicate specific distances at which outside edge 202 can be set and locked from the edge of the planar structure of the measuring device to which adjustable width-extending accessory 200 is attached. Measuring markers 212 also include extended lines 214, and movable planar structure 201 comprises a mark or indicator 213 that may be aligned with extended lines 214 when outside edge 202 is at the distance indicated by measuring marker 212 with which the indicator 213 is aligned. Those skilled in the art, in light of the present teachings, will readily recognize that a multiplicity of suitable means exist for indicating the width at which the adjustable width-extending accessories are set in alternate embodiments, such as, but not limited to, forming a window or partial opening on the end of the movable planer structure 201 wherein the measuring markers 212 would be centered within the window or opening to indicate that distance, The examples illustrated in FIGS. 30 and 31 show movable planar structure 201 set to add maximum and minimum amounts of width respectively to the width of material measured and cut. In the present embodiment as illustrated by way of example in FIG. 30, movable planar structure 201 is set to add one and one quarter of an inch (1¼") to the width of material measured and cut, and in the present embodiment illustrated by way of example in FIG. 31, movable planar structure 201 is set to add one-half an inch (½") to the width of material measured and cut. In light of the present teachings, it will be appreciated by those skilled in the art that adjustable width-extending accessories may be implemented with various different maximum and minimum widths in alternate embodiments.

Figure 33:
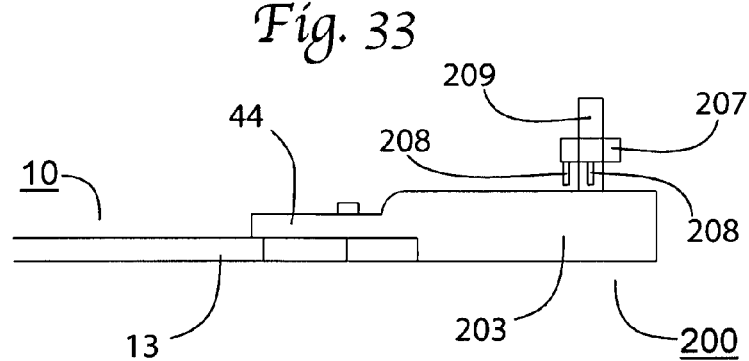
FIGS. 33 and 34 illustrate an exemplary locking mechanism for an adjustable width-extending accessory for a measuring device, in accordance with an embodiment of the present invention.
Figure 34:
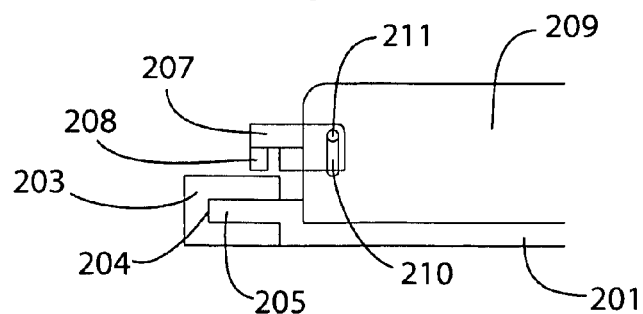

FIGS. 33 and 34 illustrate an exemplary locking mechanism 207 for an adjustable width-extending accessory 200 for a measuring device, in accordance with an embodiment of the present invention. FIG. 33 is a front view, and FIG. 34 is a side cross sectional view of locking mechanism 207 attached to a vertical extension 209 of adjustable width-extending accessory 200. In the present embodiment, end 203 of adjustable width-extending accessory 200 forms a groove 204. The end of a movable planar structure 201 forms a tongue 205 that fits into and slides back and forth within groove 204. This keeps the outside edge of movable planar structure 201 level with and parallel to the edge of a planar structure 13 as movable planar structure 201 moves. Adjustable width-extending accessory 200 also provides a means to lock movable planar structure 201 at specific distances from the edge of planar structure 13. As shown by way of example in FIGS. 30 through 32, this can be accomplished by having holes or slots formed through the upper surface of ends 203 that form groove 204 and having a small locking mechanism 207 that includes pins or tabs 208 that can be engaged into slots 206. The present embodiment comprises two tabs 208; however, alternate embodiments, may comprise more or fewer tabs. Furthermore, tabs in alternate embodiments may be various different shapes such as, but not limited to, cylindrical pins, etc. Referring to FIGS. 33 and 34, locking mechanism 207 is attached to a vertical extension 209 that protrudes from the upper surface of movable planar structure 201. In the present embodiment, an elongate opening 210 is formed through vertical extension 209 and a pin 211 is inserted through a hole or formed as part of locking mechanism 207 that keeps locking mechanism 207 attached to vertical extension 209 while allowing locking mechanism 207 to slide up and down within elongate opening 210. In typical use of the present embodiment, a user moves locking mechanism 207 up so that tabs 208 are disengaged from the slot in ends 203 and moves movable planar structure 201 to another desired distance from the edge of planar structure 13. At least one tab 208 is then aligned with at least one of the slots and locking mechanism 207 may be lowered so that tabs 208 are engaged into the slot thereby locking movable planar structure 201 in place. A user can then cut along the outside edge of movable planar structure 201, thereby increasing the width of material that is measured and cut, by the distance between the outside edge of movable planar structure 201 and the edge of planar structure 13 to which it is attached. Those skilled in the art, in light of the teachings of the present invention, will readily recognize other alternative and suitable mechanisms to achieve the alignment and/or the desired distance from the edge of planar structure.

Figure 35:
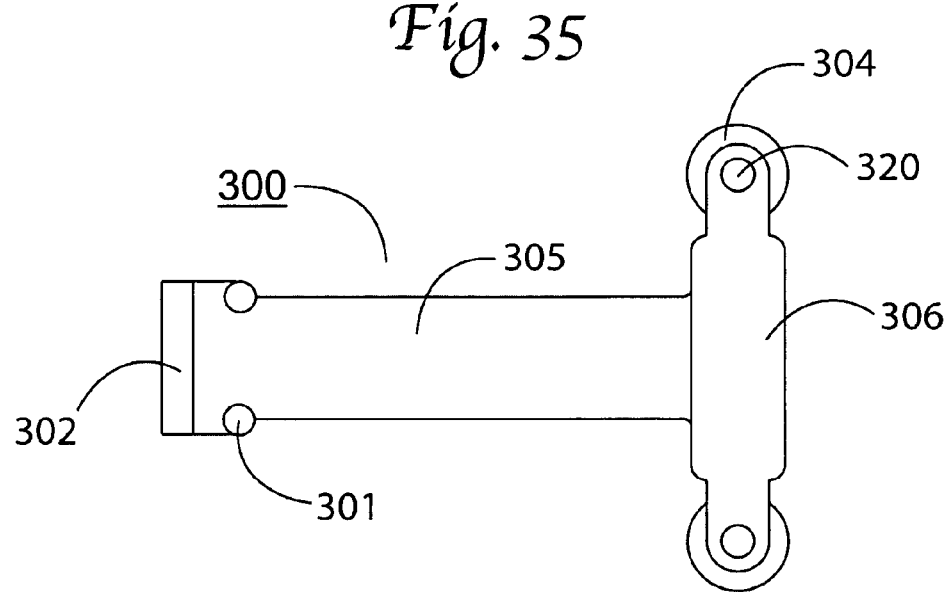
Figure 36:
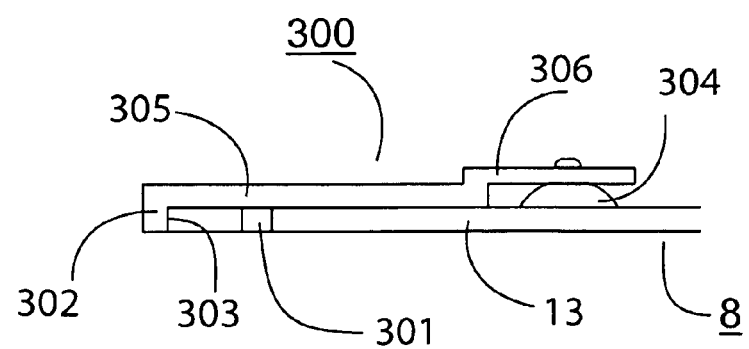

FIGS. 35 through 37 illustrate an exemplary connector accessory 300 for connecting two or more measuring devices, in accordance with an embodiment of the present invention. FIG. 35 is a top view of connector accessory 300. FIG. 36 is a cross sectional view of connector accessory 300 attached to a measuring device 8, and FIG. 37 is a top view of connector accessory 300 connecting two measuring devices 8. In the present embodiment, connector accessory 300 enables a user to connect two or more measuring devices 8 together end-to-end or side-by-side. Connecting two measuring devices 8 together doubles the length or width of material a user can measure and cut. In the present embodiment, connector accessory 300 comprises a planar structure 305 with two extensions 301 attached to or formed as extensions from its lower surface. Extensions 301 aid in accurately aligning two measuring devices 8 by fitting into holes 11 formed through a planar structure 13 of measuring device 10. One end of connector 300 extends downward to form a lip 302. An opposite raised end 306 is slightly raised and comprises at least two suction cups 304. Referring to FIG. 37, in typical use of the present embodiment, a user aligns edges 303 of two measuring devices 8 together end-to-end and inserts extensions 301 of connector accessory 300 into holes 11 of measuring devices 8. The user then presses suction cups 304 onto the surface of planar structures 13 thereby connecting measuring devices 8 together. Referring to FIG. 36, lip 302 is formed at the correct distance and angle from extensions 301 so that lip 302 fits snugly against edges 303 of measuring devices 8 and across the point where measuring devices 8 come together when connector accessory 300 is attached as described. This adds additional stability and a secure connection and aids in alignment. However, in an alternate embodiment, the connector may not include a lip and may connect measuring devices using suction cups and extensions only. Another alternate embodiment may not comprise extensions and may connect the measuring devices using only a lip and suction cups, and yet another alternate embodiment may connect measuring devices using suction cups only. Extensions 301 may be any shape such as, but not limited to, round, square, triangle or oval. In the preferred embodiment illustrated here, holes 11 formed in planar structure 13 of measuring devices 8 are the same shape and size as extensions 301; however, it is to be recognized that holes 11 may be larger than extensions 301 as long as extensions 301 fit snugly against a substantial enough portion of the edge of holes 11 to hold the edges of measuring devices 8 together. Referring to FIG. 36, connector accessory 300 further comprises raised end 306, into which suction cups 304 are attached. In the present embodiment, holes 320 are formed through raised end 306 on one end of connector accessory 300 into which the tops of suction cups 304 are snap fitted. Those skilled in the art, in light of the present teachings, will readily recognize that there are alternate means for attaching the suction cups such as, but not limited to, gluing, sonic welding, using a keyhole design, or using suction cups with pilot holes formed in their tops into which various screws or tacks can be inserted. In the present embodiment, when extensions 301 are pressed into holes 11 formed through measuring devices 8, suctions cups 304 may be pressed onto the surface of planar structures 13. Raised end 306 of connector accessory 300 is formed at the correct height and angle so that planar structure 305 of connector accessory 300 is parallel to and pressed against the upper surface of planar structures 13 of measuring devices 8. This aids in keeping the upper surfaces of the two planar structures 13 of measuring devices 8 level and parallel with each other. Referring to FIG. 37, one connector accessory 300 is used to attach two measuring devices 8 together end-to-end. A user uses edges 303 of measuring devices 8 to guide a rotary cutting device when connected end-to-end, and therefore should keep edges 303 unobstructed.

Figure 40:
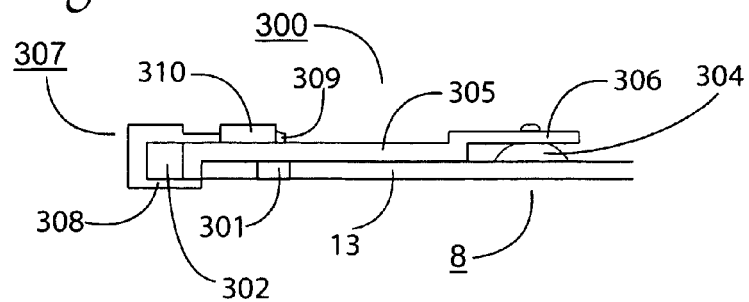
FIGS. 40 through 43 illustrate an exemplary connector accessory with a locking mechanism that may be used with a measuring device in which the lower surface of a planar structure is raised by means such as, but not limited to, having non-slip frictional strips attached along the edges of planar structure, in accordance with an embodiment of the present invention.
Figure 41:
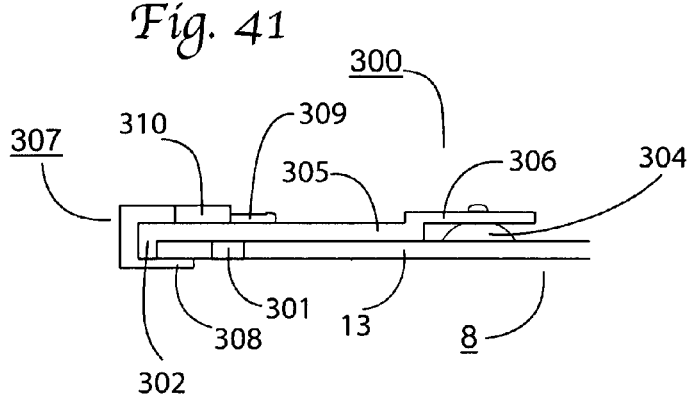
Figure 42:
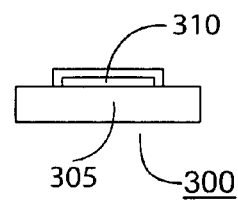
Figure 43:
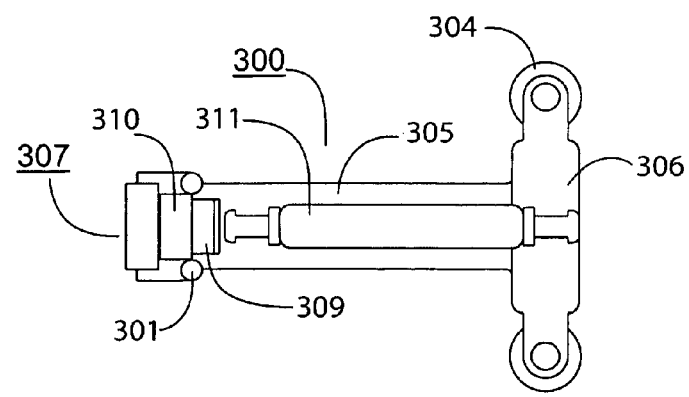

FIGS. 38 and 39 illustrate an exemplary connector accessory 300a for connecting two or more measuring devices together, in accordance with an embodiment of the present invention. FIG. 38 is a top view of connector accessory 300a, and FIG. 39 is a top view of two connector accessories 300a connecting two measuring devices 8. In the present embodiment, connector accessory 300a comprises a planar structure 305 with extensions 301 and a lip 302. Connector accessory 300a further comprises a raised end 306 with holes 320 into which suction cups 304 are inserted. In the present embodiment planar structure 305 is shorter than in the embodiment illustrated by way of example in FIGS. 35 through 37. Those skilled in the art, in light of the present teachings, will readily recognize that there is a multiplicity of suitable sizes for connector accessories in alternate embodiments depending on various factors such as, but not limited to, the size of the measuring devices or accessories that the connector accessories are connecting, etc. Referring to FIG. 39, two connector accessories 300a are connecting two measuring devices 8 side-by-side. To connect measuring devices 8, extensions 301 of connector accessories are inserted into holes 11 of measuring devices 8, similarly to the way in which connector accessory 300 is connecting measuring devices 8 as illustrated by way of example in FIGS. 36 and 37. Preferably one longer connector accessory is used to connect measuring devices end-to-end, and two shorter connector accessories are used to connect measuring devices side-by-side. However, measuring devices may be connected by more or fewer connector accessories in various configurations depending on factors such as, but not limited to, the number of holes in the measuring devices, the size of the measuring devices, etc. Furthermore, connector accessories may be used to connect various accessories such as, but not limited to width-extending accessories and length-extending accessories, to measuring devices. The connector accessories illustrated by way of example in FIGS. 35 through 39 may be used to connect measuring devices that are raised off of the work surface or measuring devices that lie flat on the work surface FIGS. 40 through 43 illustrate an exemplary connector accessory 300 with a locking mechanism 307 that may be used with a measuring device 8 in which the lower surface of a planar structure 13 is raised by means such as, but not limited to, having non-slip frictional strips attached along the edges of planar structure 13, in accordance with an embodiment of the present invention. FIG. 40 is a side cross sectional view of connector accessory 300 attached to measuring device 8 with locking mechanism 307 in an unlocked position. FIG. 41 is a side cross sectional view of connector accessory 300 attached to measuring device 8 with locking mechanism 307 in a locked position. FIG. 42 is a front cross sectional view of connector accessory 300, and FIG. 43 is a top view of connector accessory 300. In the present embodiment, connector accessory 300 comprises a planar structure 305 with extensions 301, a lip 302 and a raised end 306 with suction cups 304. Locking mechanism 307 is attached to connector accessory 300 by snap fitting an end 309 of locking mechanism 307 through a slot 310 in connector accessory 300; however, in alternate embodiments comprising a locking mechanism, the locking mechanism may be attached by other means including, without limitation, a hole formed on or attached to the upper surface of the planar structure of the connector accessory. In the present embodiment, end 309 is able to move back-and-forth within slot 310. Locking mechanism 309 further comprises a lip 308. The upper surface of lip 308 is parallel to the lower surface of lip 302 of connector accessory 300. Lip 308 is preferably formed to a length so that when locking mechanism 307 is moved outward, as shown by way of example in FIG. 40, to a position furthest out from lip 302 of connector accessory 300, lip 308 does not extend past the lower surface of lip 302. When moved inward, as shown by way of example in FIG. 41, towards connector accessory 300 lip 308 extends past the lower surface of lip 302. In alternate embodiments, locking mechanisms similar to locking mechanism 307 may be implemented on connector accessories with various different designs, for example, without limitation, connector accessories with no lips or connector accessories with no extensions.

In typical use of the present embodiment, a user moves locking mechanism 307 outward and attaches connector accessory 300 with locking mechanism 307 to two measuring devices 8 in the same manner as previously described for measuring devices whose lower surfaces may or may not be raised. The user may then move locking mechanism 307 inward so that lip 308 hooks underneath the lower surface of planar structure 13 of measuring device 8. This provides additional stability to the connection between the two measuring devices 8. Referring to FIG. 43, connector accessory 300 may also include a built-in handle 311 that is attached to the upper surface of planar structure 305 of connector accessory 300.

FIGS. 44 and 45 illustrate an exemplary barrier device 90 for use with a measuring device, in accordance with an embodiment of the present invention. FIG. 44 is a top view of barrier device 90, and FIG. 45 is a cross sectional view of barrier device 90 attached to a measuring device 8. In the present embodiment, barrier device 90 is designed to provide a barrier between the rotary cutting device that a user would typically use to cut along an edge 105 of a planar structure 13 of measuring device 8 and the user's fingers. Barrier device 90 comprises a locking portion 93 that includes a hole 45 that can accommodate a locking mechanism, for example, without limitation, locking mechanism 50, illustrated by way of example in FIGS. 23 through 26. However, in alternate embodiments the barrier device may be attached to the measuring device using other means including, without limitation, extensions inserted into holes in the measuring device with no locking mechanisms, suction cups by themselves or in combination with extensions, screws, etc. In yet other alternate embodiments, a barrier device may be formed into the measuring device or glued onto the measuring device. However, the barrier device is preferably removable from the measuring device enabling a user to use the same barrier device on multiple measuring devices. In the present embodiment, barrier device 90 further comprises an elongate vertical portion 91 that protrudes vertically from the upper surface of planar structure 13 when barrier device 90 is attached to planar structure 13 of measuring device 8. Barrier device 90 also comprises an elongate horizontal portion 92 that is perpendicular to elongate vertical portion 91 and whose lower surface is parallel to the surface of planar structure 13 to add stability to barrier device 90 when attached to measuring device 10. In alternate embodiments, barrier devices may be implemented with no horizontal portion or a wider horizontal portion that also extends partially or exclusively in front of the vertical portion depending on factors such as, but not limited to, the attachment means of the device, etc.

FIGS. 46 and 47 illustrate an exemplary blade-guiding accessory 160 for use with a measuring device, in accordance with an embodiment of the present invention. FIG. 46 is a top view of blade-guiding accessory 160, and FIG. 47 is a close-up view of an end of blade-guiding accessory 160 attached to a measuring device 8. In the present embodiment, blade-guiding accessory 160 provides a narrow channel or slot 104 that aids a user in guiding the blade of a rotary cutting device along an edge 105 of a planar structure 13 of measuring device 8. Blade-guiding accessory 160 comprises a narrow planar structure 101 that is the same length and thickness as edge 105 of planar structure 13 to which blade-guiding accessory 160 is attached. In the present embodiment, blade-guiding accessory 160 further comprises a raised portion 93 that comprises a hole 45 that can accommodate a locking mechanism, for example, without limitation, locking mechanism 50 illustrated by way of example in FIG. 23. However, in alternate embodiments, the blade-guiding accessory may attach to the measuring device by other means such as, but not limited to, extensions inserted into holes in the measuring device with no locking mechanisms, suction cups by themselves or in combination with extensions, screws, etc. Referring to FIG. 46, when blade-guiding accessory 160 is attached to edge 105 of planar structure 13, a straight inside edge 102 of narrow planar structure 101 is a consistent distance from edge 105 of planar structure 13 of measuring device 8 thereby forming narrow slot 104 between them. Narrow slot 104 may vary in width, and is preferably from ten to fifty thousandths of an inch wide. In the present embodiment, straight inside edge 102 of narrow planar structure 101 angles away from edge 105 of planar structure 13 near both ends of blade-guiding accessory 160 thereby creating a wider opening 103 near the ends of slot 104. However, alternate embodiments may be implemented without wider openings at the ends of the slot or with a wider opening at only one end of the slot. In typical use of the present embodiment, a user inserts the blade of a rotary cutting device into wider opening 103 of slot 104. As the user moves the blade towards the other end of blade-guiding accessory 160, the blade is guided into narrow slot 104 thereby limiting the movement of the blade so as to keep the blade in alignment against edge 105 of planar structure 13.

FIG. 48, illustrates an exemplary blade-guiding accessory 110 for use with a measuring device, in accordance with an embodiment of the present invention. In the present embodiment, blade-guiding accessory 110 comprises an inner planar structure 108 and an outer planar structure 107. Inner planar structure 108 is approximately the same thickness and length as the edge of the planar structure of the measuring device to which blade-guiding accessory is made to attach and extends the width of the measuring device. An inside edge 109 of inner planar structure 108 may contact the edge of the planar structure of the measuring device when blade-guiding accessory 110 is attached to it. Inner planar structure 108 can add any width to the measuring device such as, but not limited to, those previously described for width extending accessories 40, 60, 70, and 80. Alternate embodiments of width-extending, blade-guiding accessories may comprise multiple sots at various widths. For example, without limitation, one alternate embodiment may comprise three blade-guiding slots at the most common widths for seam allowances, one-half inch (½"), seven eighths of an inch (⅞"), and one and one-quarter inch (1¼"). In the present embodiment, outer narrow planar structure 107 is the same thickness and length as inner planar structure 108 and is formed so that an inside straight edge 102 is a consistent distance from an outside edge 111 of inner planar structure 108 thereby creating a narrow slot 106 between the planar structures for most of their lengths. In the present embodiment, the width extending blade-guiding accessory 110 further comprises a wider opening 103 near at least one end of slot 106 that helps guide the blade of a cutting device into narrow slot 106. However, alternate embodiments may not comprise wider openings at the ends of the narrow slot, and yet other alternate embodiments may only include a wider opening at one end of the slot. In the present embodiment, inner planar structure 108 adds to the width of material a user can measure and cut with the measuring device to which blade-guiding accessory 110 is attached, and narrow slot 106 keeps the blade in alignment against outside edge 111 of inner planar structure 108 while a user is cutting the material.

Those skilled in the art, in light of the present teachings, will readily recognize that a there are a multiplicity of suitable accessories may be implemented for use with measuring devices in accordance with embodiments of the present invention. For example, without limitation, one exemplary accessory is a length-extending accessory that attaches to the top or bottom of a measuring device rather than the side of the measuring device. Another exemplary accessory may comprise a cutting blade that slides or rolls along the outer edge of the accessory or the measuring device. Furthermore, cutting blades may be incorporated into various other types of accessories such as, but not limited to, width-extending accessories. Another exemplary accessory may enable users o cut decorative edges on the material such as, but not limited to, a saw tooth edge, a wave, etc. Furthermore, accessories may be attached to other accessories enabling a user to use multiple accessories at once. For example, without limitation, a user may attach a blade-guiding accessory or a barrier device to the edge of a width-extending accessory. In the figures illustrating the accessories described above, the accessories were shown attached to a flat measuring device 8. However, those skilled in the art, in light of the present teachings will readily recognize that accessories such as, but not limited to, those described previously may be attached to various types of measuring devices according to embodiments of the present invention for example, without limitation, measuring devices with movable material guides, measuring devices with non-slip extensions, etc.

Figure 49:
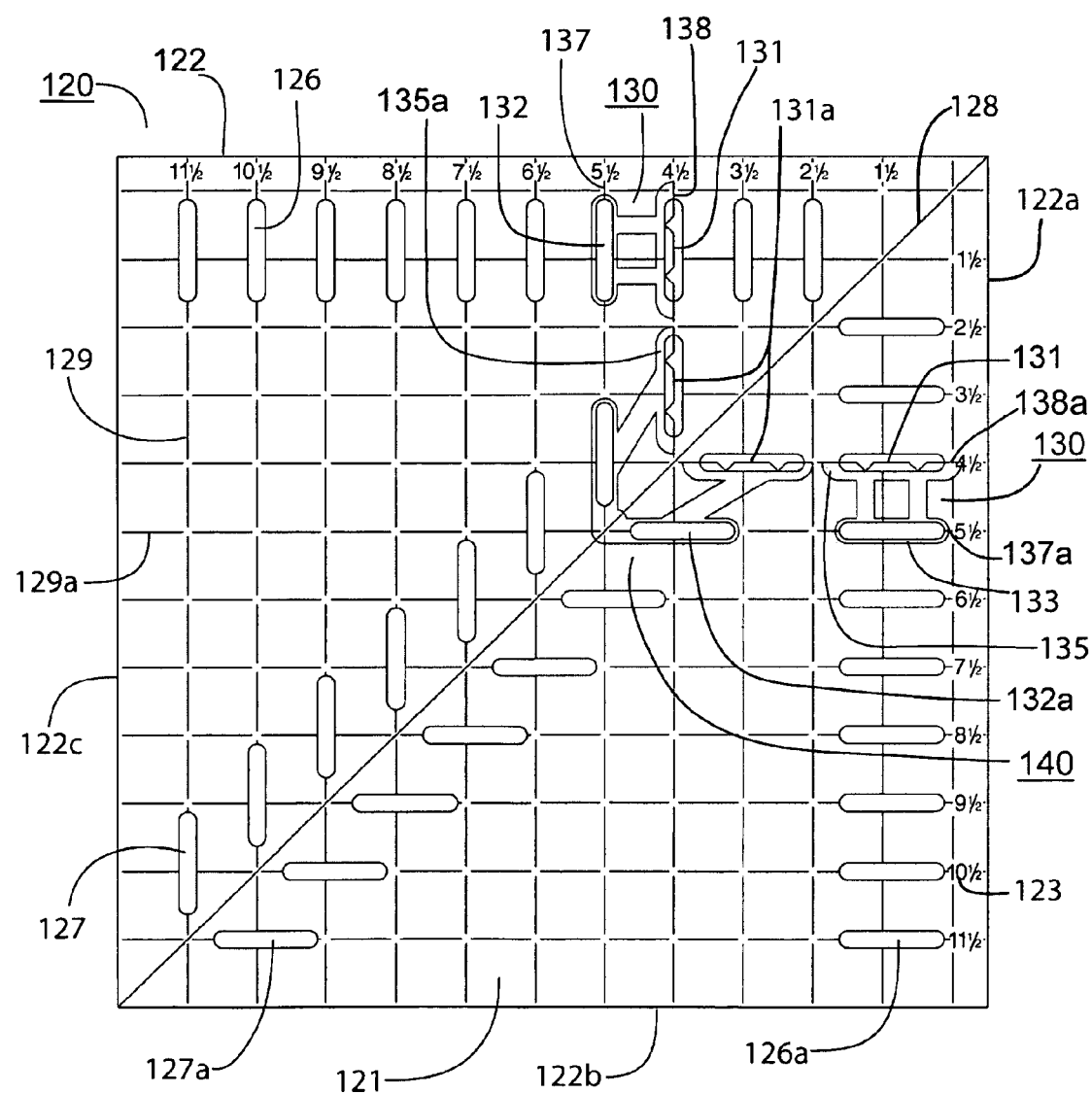
FIG. 49 is a top view of an exemplary square measuring device, in accordance with an embodiment of the present invention.

FIG. 49 is a top view of an exemplary square measuring device 120, in accordance with an embodiment of the present invention. In the present embodiment, square measuring device 120 comprises a square planar structure 121 that may have rounded or sharp corners. Square planar structure 121 is preferably formed of transparent material such as, but not limited to, plastic or acrylic; however, the square planar structures in some embodiments may be made of various other materials such as, but not limited to, opaque plastic, wood, rubber, etc. In the present embodiment, square planar structure 121 comprises an upper surface and a lower surface and four edges 122, 122a, 122b, and 122c that are equal in length. Square measurement device 120 comprises two sets of markings or measurement lines, vertical measurement lines 129 and horizontal measurement lines 129a, that can be applied to the lower surface of square planar structure 121 using various methods including, without limitation, printing, silk screening, hot stamping, etc. Vertical measurement lines 129 are parallel to two edges 122a and 122c of square planar structure 121 and start at a distance of one-half inch (½") from edge 122a. Vertical measurement lines 129 are spaced at even intervals thereafter for example, without limitation, every inch (1") or one-half inch (½") from edge 122a. Horizontal measurement lines 129a are parallel to edges 122 and 122b of square planar structure 121 and start at a distance of one-half inch (½") from edge 122. Horizontal measurement lines 129a are spaced at even intervals thereafter, for example, without limitation, every inch (1") or one-half inch (½") from edge 122. In alternate embodiments the sets of measurement lines may start at a distance shorter or longer than one-half inch (½") from the edge of the square planar structure, for example, without limitation, a quarter of an inch (¼"), one inch (1"), etc, and the intervals at which the measurement lines are spaced may also vary, for example, without limitation, every quarter inch (¼"), eighth of an inch (⅛"), sixteenth of an inch (1/16"), etc. Yet other alternate embodiments may comprise sets of measurement lines in metric units. The present embodiment also comprises measurement markers 123. In the present embodiment, measuring markers 123 are numbers that are used to indicate the number of inches that measurement lines 129 and 129a are from edges 122 and 122a of square measuring device 120. Square measuring device 120 further comprises a straight diagonal marking 128 that runs from one corner to an opposite corner of square planar structure 121. Measurement lines 129 and 129a and diagonal marking 128 may be solid lines or intermittent lines with gaps in between. In the present embodiment, vertical measurement lines 129 are spaced at one-inch (1") intervals starting at one-half inch (½") in from edge 122a, and horizontal measurement lines 129a are spaced at one-inch (1") intervals starting at one-half inch (½") in from edge 122.

In the present embodiment, square planar structure 121 is a twelve and one-half inch (12½") square; therefore measurement lines 129 and 129a are perpendicular to each other and indicate twelve distances from edges 122 and 122a. In light of the present teachings, it will be appreciated by those skilled in the art that there may be additional measurement lines that indicate subdivisions of the one-inch intervals. Furthermore, alternate embodiments may be various different sizes. The present embodiment comprises measurement markers 123, which are printed, hot-stamped or otherwise marked on square planar structure 121 along at least two edges 122 and 122a to indicate the distance that measurement lines 129 and 129a are from edges 122 and 122a starting at one and one-half inches (1½") and running sequentially up to eleven and one-half inches (11½"). In light of the present teachings, it will be appreciated by those skilled in the art that there may be additional measurement lines along edges 122b and 122c to indicate the distance of measurement lines 129 and 129a from edges 122b and 122c.

In the present embodiment, square-measuring device 120 further comprises vertical holes 126 and horizontal holes 126a formed through square planar structure 121, at least one material alignment guide 130 that includes a raised portion 132 that can be engaged within one of the holes 126 or 126a and a guide portion 135. Raised portion 132 comprises a flanged bottom 133 whose outer dimension is larger than holes 126 or 126a. When raised portion 132 of material alignment guide 130 is inserted into a hole 126 or 126a from the lower surface of planar structure 121, the upper surface of flanged bottom 133 contacts the lower surface of square planar structure 121 stopping raised portion 132 of material alignment guide 130 at that position in hole 126 or 126a. Holes 126 and 126a may be any geometric shape such as, but not limited to, squares, circles, rectangles, triangles, or polygons. In the present embodiment, holes 126 and 126a are oval in shape and spaced an equal distance apart near edges 122 and 122a of square planar structure 121. Vertical holes 126 are preferably arranged so that vertical measurement lines 129 that are perpendicular to edge 122 of planar structure 121 run through the lengthwise centers of vertical holes 126. Horizontal holes 126a are also oval in shape and spaced an equal distance apart near edge 122a of planar structure 121. Horizontal holes 126a are preferably arranged so that horizontal measurement lines 129a that are perpendicular to edge 122a of square planar structure 121 run through the lengthwise centers of horizontal holes 126a. This arrangement enables the lengthwise centers of vertical holes 126 to be perpendicular to the lengthwise centers of horizontal holes 126a. Square-measuring device 120 also comprises vertical holes 127 and horizontal holes 127a that are formed as pairs through square planar structure 121 and whose lengthwise centers are perpendicular to each other and are on opposite sides of diagonal line 128. Holes 127 and 127a may be the same size and shape or a different size and shape from holes 126 and 126a. In the present embodiment, holes 127 and 127a are the same size and oval shape as holes 126 and 126a and are arranged in accordance with measurement lines 129 and 129a. Measuring device 120 also comprises a double material alignment guide 140 that comprises two raised portions 132a that are engaged within a pair of holes 127 and 127a and two guide portions 135a.

In the present embodiment, raised portions 132 of material alignment guides 130 are inserted into a vertical hole 126 and a horizontal hole 126a that are aligned with perpendicular five and one-half inch (5½") measurement lines 137 and 137a, and material alignment guides 130 are an inch (1") wide from the lengthwise centers of raised portions 132 to front edges 131. Front edges 131 of material alignment guides 130 are therefore in alignment with the lengthwise centers of oval holes 126 and 126a that are aligned with perpendicular four and one-half inch (4½") measurement lines 138 and 138a. The present embodiment also comprises double material alignment guide 140 whose raised portions 132a are inserted into holes 127 and 127a that are aligned with perpendicular five and one-half inch (5½") measurement lines 137 and 137a. Since the lengthwise centers of raised portions 132a are an inch from front edges 131a of double material alignment guide 140, the front edges 131a of double material alignment guide 140 are therefore in alignment with the lengthwise centers of holes 127 and 127a that are aligned with perpendicular four and one-half inch (4½") measurement lines 138 and 138a. Therefore, front edges 131 and 131a of material alignment guides 130 and double alignment guide 140 are in alignment with measurement lines 138 and 138a that outline two adjacent edges of a four and one-half inch (4½") square with edges 122 and 122a of square planar structure 121 up to four and one-half inch (4½") measurement lines 138 and 138a forming the opposite two adjacent edges. A user can set material alignment guides 130 and double material alignment guide 140 to mark the outline of various sizes of squares in this manner. The user can then align two adjacent perpendicular straight edges of a piece of material with front edges 131 and 131a of material alignment guides 130 and double material alignment guide 140 and then cut along the opposite adjacent edges 122 and 122a of square planar structure 121 to cut a square of the desired size from the material. In quilting it is common that square pieces formed by sewing smaller pieces of various geometric shapes together are trimmed so they form accurate squares. Square measuring device 120, material alignment guides 130 and double material alignment guide 140 enable quilters to square up various sizes of squares with one tool.

Those skilled in the art, in light of the present teachings, will readily recognize that alternate embodiments may comprise various different configurations of material alignment guides. For example, without limitation, some embodiments may comprise only one double material alignment guide, and other embodiments may comprise multiple single material alignment guides and no double material alignment guide, etc. Furthermore, in alternate embodiments holes into which material alignment guides may be inserted may be spaces at various different intervals, for example, without limitation, every half-inch (½"), quarter inch (¼"), etc.

Accessories such as, but not limited to, width-extending accessories, connector accessories, barrier devices, blade-guiding devices, etc. may be attached to square measurement devices using means such as, but not limited to, suction cups or clamps. In alternate embodiments square measurement devices may be implemented with holes into which various accessories may be inserted with or without locking mechanisms. Also, in some embodiments, square measuring devices may comprise non-slip extensions extending from their bottom surfaces.

Figure 50:
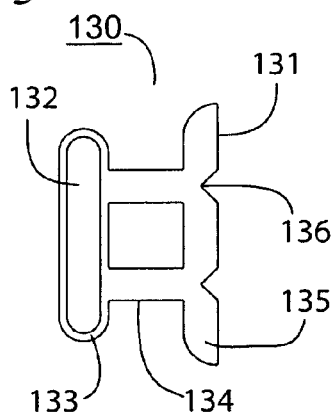
FIGS. 50 through 54 illustrate an exemplary material alignment guide for a square measuring device, in accordance with an embodiment of the present invention.
Figure 51:
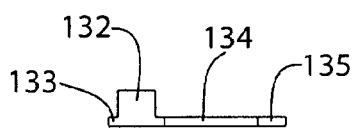
Figure 52:
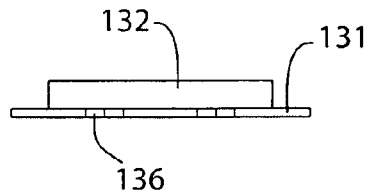
Figure 53:
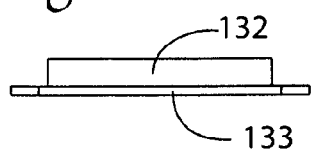
Figure 54:
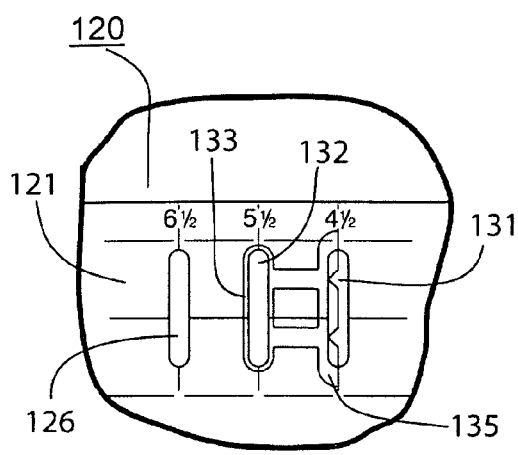

FIGS. 50 through 54 illustrate an exemplary material alignment guide 130 for a square measuring device, in accordance with an embodiment of the present invention. FIG. 50 is a top view, FIG. 51 is a side view, FIG. 52 is a front view, FIG. 53 is a rear view, and FIG. 54 is a top view of material alignment guide 130 attached to a square measuring device 120. In the present embodiment, material alignment guide 130 comprises a guide portion 135 that provides a straight front edge 131 that comprises notches 136 to make it easier to see when material is aligned to front edge 131. Guide portion 135 is connected to a raised portion 132 by at least one connecting strip 134. Guide portion 135 and connecting strips 134 are thin and flat while raised portion 132 is the same geometric shape and size as holes 126 in square measuring device 120. In the present embodiment raised portion 132 and holes 126 are oval in shape; however, the raised portions and holes in alternate embodiments may have various different shapes including, without limitation, circles, squares, rectangles, etc. It will be recognized by those skilled in the art that the raised portion 132 need not be the same size and shape as the holes 126. In many practical applications a requirement is that it contacts a significant enough portion of the edges of the holes to be frictionally held in place when inserted. For example, without limitation, only the ends of the raised portion 132 could be raised while still providing for the guide 130 to be frictionally held in place within the hole 126 formed in the planer structure 121 of the square measuring device 120. Referring to FIG. 54, raised portion 132 can be at least partially inserted into a holes 126 formed through a square planar structure 121 of square measuring device 120. In the present embodiment, the upper surface of a flanged bottom 133 of raised portion 132 is on a plane with the upper surfaces of guide portion 135 and connecting strips 134; therefore, when raised portion 132 is inserted from the lower surface of planar structure 121 all the way into holes 126, the upper surface of guide portion 135 and connecting strips 134 are held flat and level against the lower surface of square planar structure 121. Furthermore, front edge 131 of guide portion 135 is parallel to the lengthwise center of the oval raised portion 132 to which guide portion 135 is directly connected by connecting strips 134, and the distance between the lengthwise center of raised portion 132 and front edge 131 of guide portion 135 is the same as the distance between measurement lines 129. Therefore, front edge 131 of guide portion 135 aligns with the lengthwise center of the hole 126 that precedes the hole 126 into which raised portion 132 is engaged. Those skilled in the art, in light of the present teachings, will readily recognize that material alignment guides and the holes in which the material alignment guides are inserted may be configured in various ways in alternate embodiments. For example, without limitation, the holes may be between the measurement lines rather than on the measurement lines so that the front edges of the material alignment guides may be integrated into the flanged bottoms of the material alignment guides. Furthermore, material alignment guides may be sized differently to work with square measuring devices with measurement lines at different intervals. For example, without limitation, a square measuring guide that has measurement lines every half-inch (½") may have a material alignment guide that is one-half inch (½") from the center of the raised portion to the front edge.

Figure 55:
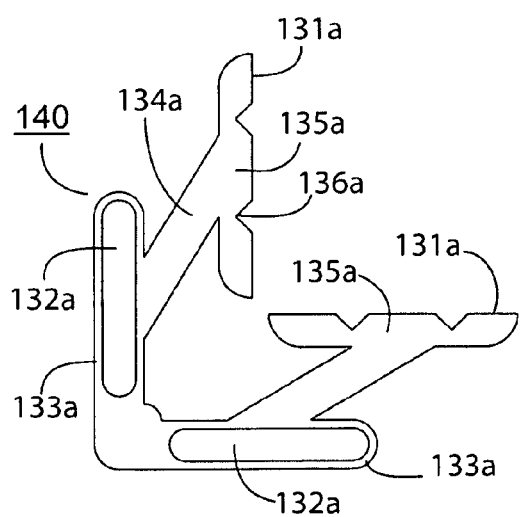
FIG. 55 is a top view of an exemplary double material alignment guide for a square measuring device, in accordance with an embodiment of the present invention.

FIG. 55 is a top view of an exemplary double material alignment guide 140 for a square measuring device, in accordance with an embodiment of the present invention. In the present embodiment, double material alignment guide 140 comprises two guide portions 135a with two front edges 131a. Front edges 131a include notches 136a. Guide portions 135a are connected to raised portions 132a by at least one connecting strip 134a and a flanged bottom 133a. Guide portions 135a and connecting strips 134a are thin and flat while raised portions 132a are the same geometric shape and size as the holes in the square measuring device into which raised portions 132a are to be inserted. In the present embodiment raised portions 132a and holes 126 are oval in shape; however, the raised portions and holes in alternate embodiments may have various different shapes including, without limitation, circles, squares, rectangles, etc. In the present embodiment, the upper surface of flanged bottom 133a is on a plane with the upper surfaces of guide portions 135a and connection strips 134a; therefore, when raised portions 132a are inserted from the lower surface of the planar structure of the square measuring device all the way into the holes in the square measuring device, the upper surface of guide portions 135a and connecting strips 134a are held flat and level against the lower surface of square planar structure. Furthermore, front edges 131a of guide portions 135a are parallel to the lengthwise centers of the oval raised portions 132a, to which guide portions 135a are directly connected by connecting strips 134, and the distance between the lengthwise center of raised portions 132a and front edges 131a of guide portions 135a is the same as the distance between the measurement lines of the square measurement device to which double material alignment guide 140 is attached. Therefore, front edges 131a of guide portions 135a align with the lengthwise centers of the holes in the square measurement device that precede the holes into which raised portions 132a are engaged. Those skilled in the art, in light of the present teachings, will readily recognize that material alignment guides and the holes in which the material alignment guides are inserted may be configured in various ways in alternate embodiments. For example, without limitation, the holes may be between the measurement lines rather than on the measurement lines so that the front edges of the material alignment guides may be integrated into the flanged bottoms of the material alignment guides without connection strips. Furthermore, material alignment guides may be sized differently to work with square measuring devices with measurement lines at different intervals. For example, without limitation, a square measuring guide that has measurement lines every half-inch (½") may have a material alignment guide that is one-half inch (½") from the center of the raised portion to the front edge.

In alternate embodiments material alignment guides for square measuring devices may be shaped differently. For example, without limitation, in one alternate embodiment, material alignment guides may be elongate strips that are placed along the measurement lines of the square measuring device so that the ends of the material alignment guides meet at the corner of the square created by the material alignment guides. Furthermore, in alternate embodiments, material alignment guides may be attached to square measuring devices using various different means such as, but not limited to, suction cups, tabs and slots, clamps, etc.

Having fully described at least one embodiment of the present invention, other equivalent or alternative methods of providing measurement devices with movable material alignment guides and accessories according to the present invention will be apparent to those skilled in the art. The invention has been described above by way of illustration, and the specific embodiments disclosed are not intended to limit the invention to the particular forms disclosed. For example, the particular implementation of the material alignment guides may vary depending upon the particular type of measuring device used. The measuring devices described in the foregoing were directed to straight-edged implementations; however, similar techniques are to provide curved material alignment guides for use with measuring devices for curved shapes such as, but not limited to, circles and ovals. Curved implementations of the present invention are contemplated as within the scope of the present invention. The invention is thus to cover all modifications, equivalents, and alternatives falling within the spirit and scope of the following claims.

What is claimed is:

1. A transparent measuring apparatus for material, the apparatus comprising:
   a planar structure comprising a flat sheet of transparent material having a top surface, bottom surface, a left edge, a right edge, a top end, a bottom end and at least one hole for attachment of accessories;
   a plurality of measurement lines formed on at least one of said top and bottom surfaces;
   a material alignment guide removably joined to said bottom surface, said material alignment guide comprising a first edge positioned below said bottom surface for engaging and aligning an edge of the material and configured for moveably aligning said first edge with said measurement lines;
   elongate non-slip strips extending below said bottom surface and only adjacent to said left and right edges, said elongate non-slip strips extending a sufficient distance from said bottom surface to support said planar structure and said material alignment guide above a flat work surface when said elongate non-slip strips are placed on the flat work surface;
   at least one first accessory joinable to said planar structure wherein said first accessory adds width to said planar structure;
   at least one second accessory joinable to said planar structure wherein said second accessory adds length to said planar structure;
   at least one third accessory joinable to said planar structure wherein said third accessory provides a safety barrier when cutting along an edge of said planar structure; and
   at least one fourth accessory joinable to said planar structure wherein said fourth accessory provides a slot for guiding cutting along an edge of said planar structure.

2. The apparatus as recited in claim 1, wherein said material alignment guide comprises an elongate strip and said first edge comprises notches for viewing a proper alignment of the material with said first edge.

3. The apparatus as recited in claim 2, wherein said plurality of measurement lines comprises raised ribs protruding from said bottom surface.

4. The apparatus as recited in claim 3, wherein said material alignment guide comprises an elongate strip of a flexible material comprising a top strip end comprising a top hook, a bottom strip end comprising a bottom hook wherein said bottom hook can be joined to said bottom end and said top hook can be joined to said top end by flexing said strip.

5. The apparatus as recited in claim 4, wherein said material alignment guide comprises teeth positioned proximate to at least one of said top and bottom strip ends, said teeth comprising spaces for engaging said raised ribs wherein said first edge of said material alignment guide can be accurately aligned with a one of said measurement lines.

6. The apparatus as recited in claim 4, wherein said material alignment guide comprises teeth positioned proximate to said top and bottom strip ends, said teeth comprising spaces for engaging said raised ribs wherein said first edge of said material alignment guide can be accurately aligned along its length with a one of said measurement lines.

7. The apparatus as recited in claim 2, wherein said planar structure comprises at least one narrow slot perpendicular to said left and right edges.

8. The apparatus as recited in claim 7, wherein said elongate strip comprises a tab for insertion up through said narrow slot from said bottom surface.

9. The apparatus as recited in claim 8, wherein said planar structure further comprises at least one channel on said top surface perpendicular to said left and right edges, said channel comprising a plurality of notches.

10. The apparatus as recited in claim 9, wherein said tab further comprises means for joining a locking mechanism, said locking mechanism comprising at least one tooth for engaging said plurality of notches in said channel wherein said first edge of said material alignment guide can be aligned with a one of said measurement lines.

11. The apparatus as recited in claim 2, wherein said planar structure comprises at least one window perpendicular to said left and right edges.

12. The apparatus as recited in claim 11, wherein said elongate strip comprises at least two tabs for insertion up through said window from said bottom surface, each of said tabs comprising a hook for joining to opposing sides of said window.

13. The apparatus as recited in claim 12, wherein at least one of said opposing sides comprises notches and one of said tabs comprises at least a tooth for engaging said notches wherein said first edge of said material alignment guide can be aligned with a one of said measurement lines.

14. The apparatus as recited in claim 1, wherein said elongate non-slip strips further comprise frictional material for increasing a gripping force of the measuring apparatus to the flat work surface and to the material.

15. A transparent measuring apparatus for material, the apparatus comprising:
    a planar structure comprising a flat sheet of transparent material having a top surface, bottom surface, a left edge, a right edge, a top end, a bottom end and at least two holes for attachment of accessories;
    a plurality of measurement lines formed on at least one of said top and bottom surfaces;
    a material alignment guide removably joined to said bottom surface, said material alignment guide comprising a first edge positioned below said bottom surface for engaging and aligning an edge of the material and configured for moveably aligning said first edge with said measurement lines;
    elongate non-slip strips extending below said bottom surface and only adjacent to said left and right edges, said elongate non-slip strips extending a sufficient distance from said bottom surface to support said planar structure and said material alignment guide above a flat work surface when said elongate non-slip strips are placed on the flat work surface; and
    at least one width extending accessory joinable to said planar structure wherein said width extending accessory adds width to said planar structure.

16. The apparatus as recited in claim 15, wherein said elongate non-slip strips further comprise frictional material for increasing a gripping force of the measuring apparatus to the flat work surface and the material.

17. The apparatus as recited in claim 15, wherein said first edge of said material alignment guide comprises notches for viewing a proper alignment of the material with said first edge.

18. The apparatus as recited in claim 15, wherein said width extending accessory comprises:
    a planar structure extension comprising an inside edge, an outside edge, a first end a second end and an extension width;
    a first raised portion proximate said first end and a second raised portion proximate said second end, said first and second raised portions comprising lower surfaces extending away from said planar structure extension at said inside edge;
    extended bottom portions extending from said lower surfaces, said extended bottom portions comprising dimensions for fitting into said two holes of said planar structure;
    a locking hole formed through each of said first and second raised portions and said extended bottom portions; and
    a locking mechanism for securing said width extending accessory to said planar structure, said locking mechanism comprising a cylinder that can rotate within said locking hole.

19. The apparatus as recited in claim 18, wherein said cylinder comprises a flanged bottom portion and a lever joined to a top of said cylinder for rotating said cylinder.

20. The apparatus as recited in claim 19, wherein said cylinder can be rotated from an unlocked position to a locked position where, when said cylinder is in said unlocked position, said flanged bottom is oriented for fitting through one of said two holes in said planar structure and, when said cylinder is in said locked position, said flanged bottom is oriented such that said bottom surface of said planar structure restrains said flanged bottom and said width extending accessory is secured to said planar structure.

21. The apparatus as recited in claim 18, wherein said planar structure extension further comprises at least one hole for attachment of accessories.

22. The apparatus as recited in claim 18, wherein a width of said width extending accessory is a fixed width of said extension width and the material can be cut along said outside edge.

23. The apparatus as recited in claim 22, wherein said fixed width is a standard seam allowance.

24. The apparatus as recited in claim 18, wherein a width of said width extending accessory is adjustable.

25. The apparatus as recited in claim 24, wherein said first and second raised portions further extend across said planar structure for an adjustment distance greater than said extension width and said outside edge is movable within an adjustment range from said extension width to proximate said adjustment distance.

26. The apparatus as recited in claim 25, wherein said first and second raised portions further comprise means for indicating a position of said outside edge within said adjustment range.

27. The apparatus as recited in claim 26, further comprising means for locking said outside edge in positions within said adjustment range.

28. A transparent measuring apparatus for material, the apparatus comprising:
    a square planar structure comprising a flat sheet of transparent material having a top surface, bottom surface, a left edge, a right edge, a top edge, and a bottom edge;
    a plurality of horizontal and vertical measurement lines at equal increments of distance formed on at least one of said top and bottom surfaces;
    a diagonal line formed on the surface of said measurement lines;
    a plurality of holes formed through said planar structure along said horizontal and vertical measurement lines;
    a first material alignment guide removably joinable to said bottom surface, said first material alignment guide comprising a first edge positionable below said bottom surface for engaging and aligning an edge of the material and a raised portion for engaging at least one of said holes for aligning said first edge with a one of said measurement lines; and
    elongate non-slip strips comprising a frictional material extending below said bottom surface and only adjacent to edges of said planar structure, said elongate non-slip strips extending a sufficient distance from said bottom surface to support said planar structure and said material alignment guide above a flat work surface where said elongate non-slip strips increase a gripping force of the measuring apparatus to the flat work surface and to the material.

29. The apparatus as recited in claim 28, wherein all holes along said horizontal lines are below said diagonal line and all holes along said vertical lines are above said diagonal line.

30. The apparatus as recited in claim 29, wherein, when said first material alignment guide is joined to at least one hole along said horizontal lines, said first edge faces said top edge and when said first material alignment guide is joined to at least one hole along said vertical lines, said first edge faces said right edge.

31. The apparatus as recited in claim 30, further comprising a second material alignment guide removably joinable to said bottom surface, said second material alignment guide comprising a second edge for aligning an edge of the material and a raised portion for engaging at least one of said holes for aligning said second edge with a one of said measurement lines.

32. The apparatus as recited in claim 31, further comprising a third material alignment guide removably joinable to said bottom surface, said third material alignment guide comprising third and fourth edges for aligning edges of the material and at least two raised portions for engaging at least one of said horizontal and at least one of said vertical holes for aligning said third and fourth edges with measurement lines to define a corner of a square.

33. The apparatus as recited in claim 32, wherein when said first, second and third material alignment guides are joined to said bottom, said first, second, third and fourth edges define a corner and adjacent sides of a square.

34. The apparatus as recited in claim 33, wherein said first, second, third and fourth edges comprise notches for viewing a proper alignment of the material.

35. The apparatus as recited in claim 32, wherein said holes and said raised portions are oval in shape.

36. A transparent measuring apparatus for material, the apparatus comprising:
a planar structure comprising a flat sheet of transparent material having a top surface, bottom surface, a left edge, a right edge, a top end, a bottom end and a plurality holes for attachment of accessories;
a plurality of measurement lines formed on at least one of said top and bottom surfaces;
a material alignment guide removably joined to said bottom surface, said material alignment guide comprising a first edge positioned below said bottom surface for engaging and aligning an edge of the material and configured for moveably aligning said first edge with said measurement lines; and
elongate non-slip strips extending below said bottom surface and only adjacent to said left and right edges, said elongate non-slip strips extending a sufficient distance from said bottom surface to facilitate movement of said material alignment device and support said planar structure and said material alignment guide above a flat work surface when said elongate non-slip strips are placed on the flat work surface.

37. The apparatus as recited in claim 36, wherein said elongate non-slip strips further comprise frictional material for increasing a gripping force of the measuring apparatus to the flat work surface and to the material.

38. The apparatus as recited in claim 36, wherein said first edge of said material alignment guide comprises notches for viewing a proper alignment of the material with said first edge.

39. The apparatus as recited in claim 36, further comprising means for locking said material alignment guide where said first edge is accurately aligned with one of said measurement lines.

40. The apparatus as recited in claim 36, further comprising at least one accessory joinable to said planar structure wherein said accessory adds width to said planar structure.

41. The apparatus as recited in claim 40, wherein said added width is a standard seam allowance.

42. The apparatus as recited in claim 40, wherein said accessory joins said planar structure to a second planar structure comprising a top surface, bottom surface, a left edge, a right edge, a top end, a bottom end and a plurality holes for attachment of accessories.

43. The apparatus as recited in claim 42, wherein said accessory comprises extensions shaped to fit in said holes in said planar structure and said second planar structure.

44. The apparatus as recited in claim 42, wherein said accessory comprises a plurality of suction cups for adhering to said top surfaces.

45. The apparatus as recited in claim 36, further comprising at least one accessory joinable to said planar structure wherein said accessory adds length to said planar structure.

46. The apparatus as recited in claim 45, wherein said accessory joins said planar structure to a second planar structure comprising a top surface, bottom surface, a left edge, a right edge, a top end, a bottom end and a plurality holes for attachment of accessories.

47. The apparatus as recited in claim 46, wherein said accessory comprises extensions shaped to fit in said holes in said planar structure and said second planar structure.

48. The apparatus as recited in claim 46, wherein said accessory comprises a plurality of suction cups for adhering to said top surfaces.

49. The apparatus as recited in claim 36, further comprising at least one accessory joinable to said planar structure wherein said accessory provides a safety barrier when cutting along an edge of said planar structure.

50. The apparatus as recited in claim 36, further comprising at least one accessory joinable to said planar structure wherein said accessory provides a slot for guiding cutting along an edge of said planar structure.

51. A transparent measuring apparatus for material, the apparatus comprising:
a planar structure comprising a flat sheet of transparent material having a plurality holes for attachment of accessories;
means for forming measurement lines on said planar structure;
means for engaging and aligning an edge of the material with said measurement lines, said aligning means being positionable below a bottom surface of said planar structure; and
means for supporting said planar structure and said aligning means above a flat surface where said supporting means is only adjacent to edges of said planar structure.

52. The apparatus as recited in claim 51, further comprising means for increasing a gripping force of said supporting means of the measuring apparatus to an underlying work surface and to the material.

53. The apparatus as recited in claim 51, further comprising means for adding width to said planar structure.

54. The apparatus as recited in claim 51, further comprising means for adding length to said planar structure.

55. The apparatus as recited in claim 51, further comprising means for adding a safety barrier along an edge of said planar structure.

56. The apparatus as recited in claim 51, further comprising means for guiding cutting along an edge of said planar structure.

57. A transparent measuring apparatus for material, the apparatus comprising:

a planar structure comprising a top surface, bottom surface, a left edge, a right edge, a top end, a bottom end and at least one hole for attachment of accessories;

a plurality of measurement lines formed on at least one of said top and bottom surfaces, said plurality of measurement lines comprising raised ribs protruding from said bottom surface;

a material alignment guide removably joined to said bottom surface, said material alignment guide comprising an elongate strip of a flexible material comprising a first edge for aligning the material, a top strip end comprising a top hook, a bottom strip end comprising a bottom hook wherein said bottom hook can be joined to said bottom end and said top hook can be joined to said top end by flexing said strip, said material alignment guide further comprising teeth positioned proximate to at least one of said top and bottom strip ends, said teeth comprising spaces for engaging said raised ribs wherein said first edge of said material alignment guide can be accurately aligned with a one of said measurement lines;

elongate non-slip strips extending below said bottom surface and adjacent to said left and right edges, said elongate non-slip strips extending a sufficient distance from said bottom surface to support said planar structure and said material alignment guide above a flat work surface when said elongate non-slip strips are placed on the flat work surface;

at least one first accessory joinable to said planar structure wherein said first accessory adds width to said planar structure;

at least one second accessory joinable to said planar structure wherein said second accessory adds length to said planar structure;

at least one third accessory joinable to said planar structure wherein said third accessory provides a safety barrier when cutting along an edge of said planar structure; and at least one fourth accessory joinable to said planar structure wherein said fourth accessory provides a slot for guiding cutting along an edge of said planar structure.

* * * * *